(12) United States Patent
Sgolastra et al.

(10) Patent No.: US 11,634,525 B2
(45) Date of Patent: Apr. 25, 2023

(54) ZWITTERIONIC COPOLYMERS, COATING COMPOSITIONS, ARTICLES, AND COATING METHODS

(71) Applicant: 3M INNOVATIVE PROPERTIES COMPANY, St. Paul, MN (US)

(72) Inventors: Federica Sgolastra, Woodbury, MN (US); Semra Colak Atan, Saint Louis Park, MN (US); George W. Griesgraber, Eagan, MN (US); Zachary J. Malmberg, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 192 days.

(21) Appl. No.: 17/309,422

(22) PCT Filed: Dec. 11, 2019

(86) PCT No.: PCT/IB2019/060670
§ 371 (c)(1),
(2) Date: May 26, 2021

(87) PCT Pub. No.: WO2020/128732
PCT Pub. Date: Jun. 25, 2020

(65) Prior Publication Data
US 2022/0025093 A1 Jan. 27, 2022

Related U.S. Application Data

(60) Provisional application No. 62/781,954, filed on Dec. 19, 2018.

(51) Int. Cl.
| | |
|---|---|
| *C08F 230/02* | (2006.01) |
| *C08F 220/60* | (2006.01) |
| *C09D 133/14* | (2006.01) |
| *C09D 143/02* | (2006.01) |
| *C08F 220/38* | (2006.01) |
| *C09D 133/26* | (2006.01) |

(52) U.S. Cl.
CPC ........ *C08F 230/02* (2013.01); *C08F 220/385* (2020.02); *C08F 220/603* (2020.02); *C09D 133/14* (2013.01); *C09D 133/26* (2013.01); *C09D 143/02* (2013.01)

(58) Field of Classification Search
CPC .. C08F 230/02; C08F 220/603; C09D 133/14; C09D 143/02
See application file for complete search history.

(56) References Cited

U.S. PATENT DOCUMENTS

| | | | |
|---|---|---|---|
| 4,830,773 A | 5/1989 | Olson | |
| 6,916,773 B2 | 7/2005 | Griese | |
| 7,816,434 B2 | 10/2010 | Hackbarth | |
| 8,088,724 B2 | 1/2012 | Iverson | |
| 8,772,215 B2 | 7/2014 | Ryther | |
| 10,087,405 B2 | 10/2018 | Swanson | |
| 2010/0317559 A1 | 12/2010 | Ryther | |
| 2012/0273000 A1 | 11/2012 | Jing | |
| 2012/0295829 A1 | 11/2012 | Peitersen | |
| 2013/0023458 A1 | 1/2013 | Hodge | |
| 2014/0272428 A1 | 9/2014 | Hanson | |
| 2017/0275495 A1 | 9/2017 | Riddle | |
| 2020/0102526 A1 | 4/2020 | Malmberg | |

FOREIGN PATENT DOCUMENTS

| | | |
|---|---|---|
| CN | 107652394 | 2/2018 |
| JP | 60262870 | 12/1985 |
| WO | WO 2007-119195 | 10/2007 |
| WO | WO 2010-060006 | 5/2010 |
| WO | WO 2011-031613 | 3/2011 |
| WO | WO 2014-127451 | 8/2014 |
| WO | WO 2014-204763 | 12/2014 |
| WO | WO 2015-050767 | 4/2015 |
| WO | WO 2015-143163 | 9/2015 |
| WO | WO 2015-143262 | 9/2015 |
| WO | WO 2016-044082 | 3/2016 |
| WO | WO 2018-013330 | 1/2018 |
| WO | WO 2018-048696 | 3/2018 |
| WO | WO 2018-048698 | 3/2018 |

OTHER PUBLICATIONS

Kirk-Othmer, Encyclopedia of Chemical Technology, 900-912 (1979).

(Continued)

*Primary Examiner* — Catherine S Branch
(74) *Attorney, Agent, or Firm* — Jean A. Lown

(57) ABSTRACT

Zwitterionic copolymers, coating compositions (e.g., aqueous coating compositions and articles containing such copolymers, and methods of coating such coating compositions; wherein the copolymer includes: (a) first monomeric units derived from monomers of Formula (I) $CH_2=CR^1-(CO)-X-R^2-[-Q-R^3-]_n-Y$ (I) or salts thereof, wherein: $R^1$ is hydrogen or methyl; X is oxy or $-NH-$; $R^2$ is an alkylene optionally including catenary oxygen; $R^3$ is an alkylene; Q is $-(CO)O-$, $-NR^4-(CO)-NR^4-$, or $-(CO)-NR^4-$; $R^4$ is hydrogen or alkyl; n is equal to 0 or 1; and Y is phosphonic acid, phosphonate, phosphoric acid, or phosphate; and (b) second monomeric units derived from monomers of Formula (II) $CH_2=CR^1-(CO)-X-R^2-[-Q-R^3-]_n-[NR^5R^6]+-R^7-Z-$ (II) wherein: $R^1$ is hydrogen or methyl; X is oxy or $-NH-$; $R^2$ is alkylene optionally including catenary oxygen; $R^3$ is alkylene; Q is $-(CO)O-$, $-NR^4-(CO)-NR^4-$, or $-(CO)-NR4-$; $R^4$ is hydrogen or alkyl; n is equal to 0 or 1; $R^5$ and $R^6$ are each independently an alkyl, aryl, or a combination thereof, or $R^5$ and $R^6$ both combine with the nitrogen to which they are both attached to form a heterocyclic ring having 3 to 7 ring members; $R^7$ is alkylene; and Z" is carboxylate or sulfonate.

$$CH_2=CR^1-(CO)-X-R^2-[-Q-R^3-]_n-Y \qquad (I)$$

$$CH_2=CR^1-(CO)-X-R^2-[-Q-R^3-]_n-[NR^5R^6]^+-R^7-Z^- \qquad (II)$$

17 Claims, No Drawings

(56) References Cited

OTHER PUBLICATIONS

Shahrad, "Acoustic Denial of Service Attacks on Hard Disk Drives", ASHES '18: Proceedings of the 2018 Workshop on Attacks and Solutions in Hardware Security, Oct. 2018, pp. 34-39.
International Search Report for PCT International Application No. PCT/IB2019/060670, dated Jun. 30, 2020, 5 pages.

ZWITTERIONIC COPOLYMERS, COATING COMPOSITIONS, ARTICLES, AND COATING METHODS

CROSS REFERENCE TO RELATED APPLICATIONS

This application is a national stage filing under 35 U.S.C. 371 of PCT/IB2019/060670, filed Dec. 11, 2019, which claims the benefit of Provisional Application No. 62/781,954, filed Dec. 19, 2018, the disclosure of which is incorporated by reference in its/their entirety herein.

BACKGROUND

Stainless steel is ubiquitous in commercial kitchens, home kitchens, office buildings, airports, and various other public spaces. The majority of cleaning products designed for use on stainless steel surfaces are both cleaners and polishers (including mixtures of mineral oil and water, or solvent and mineral oil). The oil in these products helps hide fingerprints by blending/covering them with the applied mineral oil. The oily layer provides the substrate a shiny appearance.

Stainless steel products that utilize this clean and polish approach typically suffer from many drawbacks, including: streaking (e.g., it is difficult to get a streak-free shine); difficult to "spot clean" a portion of the surface (e.g., users typically have to clean an entire area to maintain a uniform oil layer); the product dries slowly, and the appearance changes during drying; attraction to dirt (e.g., oiled surfaces collect lint and dust easily); oil build-up (e.g., mineral oil left on surfaces can accumulate and is difficult to remove); and the inability to cut tough stains commonly found in restrooms.

Although there are commercial products that improve on these products, there is still a need for compositions that can coat, and more particularly protect, and optionally clean and protect, stainless steel surfaces, and other metal surfaces.

SUMMARY

Provided herein are zwitterionic copolymers that include phosphonic acid, phosphonate, phosphoric acid, and/or phosphate end groups, compositions and articles containing such copolymers, and methods of coating.

In one aspect of the disclosure, a copolymer (i.e., a zwitterionic copolymer) is disclosed that includes: (a) first monomeric units derived from monomers of Formula (I)

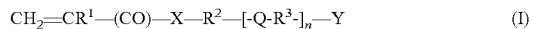

$$CH_2=CR^1-(CO)-X-R^2-[-Q-R^3-]_n-Y \quad (I)$$

or salts thereof, wherein: $R^1$ is hydrogen or methyl; X is oxy or —NH—; $R^2$ is an alkylene optionally including catenary oxygen; $R^3$ is an alkylene; Q is —(CO)O—, —$NR^4$—(CO)—$NR^4$—, or —(CO)—$NR^4$—; $R^4$ is hydrogen or alkyl; n is equal to 0 or 1; and Y is phosphonic acid, phosphonate, phosphoric acid, or phosphate; and (b) second monomeric units derived from monomers of Formula (II)

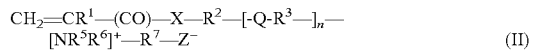

$$CH_2=CR^1-(CO)-X-R^2-[-Q-R^3-]_n-[NR^5R^6]^+-R^7-Z^- \quad (II)$$

wherein: $R^1$ is hydrogen or methyl; X is oxy or —NH—; $R^2$ is alkylene optionally including catenary oxygen; $R^3$ is alkylene; Q is —(CO)O—, —$NR^4$—(CO)—$NR^4$—, or —(CO)—$NR^4$—; $R^4$ is hydrogen or alkyl; n is equal to 0 or 1; $R^5$ and $R^6$ are each independently an alkyl, aryl, or a combination thereof (i.e., alkaryl or aralkyl), or $R^5$ and $R^6$ both combine with the nitrogen to which they are both attached to form a heterocyclic ring having 3 to 7 ring members; $R^7$ is alkylene; and $Z^-$ is carboxylate or sulfonate.

In another aspect of the disclosure, a coating composition (i.e., a liquid coating composition, and preferably, an aqueous coating composition) is provided that includes the copolymer as described herein. Such liquid coating composition may include water, an organic solvent, or both.

In another aspect of the disclosure, an article is provided that includes: a substrate; and a coating adjacent to the substrate, wherein the coating comprises a zwitterionic copolymer as described herein.

In certain embodiments, the substrate has a surface including a metal, which, for example, may form at least a portion of a kitchen appliance such as a refrigerator, dishwasher, stove, etc. In such embodiment, the coating adjacent the substrate may be in a liquid state (e.g., layer of an aqueous coating composition) or in a hardened state (e.g., dried at room temperature or above) formed from a liquid coating composition.

In certain embodiments, the substrate includes a fibrous material, which, for example, forms a wipe. In such embodiment, the coating adjacent the substrate may be a coating composition, which may be in a liquid state (e.g., an aqueous coating composition) impregnated within the fibrous substrate.

Thus, herein, a "coating" may be a layer of a coating composition in liquid form or that has been hardened. In this context, a "hardened" coating refers to one that is dried upon removal of the water and/or organic solvent. And, the term "adjacent" can be used to refer to two materials that are in direct contact, and which can be in the form of layers, such as a coating (in liquid or hardened form) on a metal substrate, or a coating (typically in liquid form) on a fibrous substrate.

In another aspect, the present disclosure provides a method of coating a surface, the method includes: providing a coating composition described herein; applying the coating composition to the surface; and allowing the coating composition to dry on the surface to form a hardened coating that includes the copolymer described herein.

As used herein, "alkyl" refers to a monovalent group that is a radical of an alkane and includes straight-chain, branched, cyclic, and bicyclic alkyl groups, and combinations thereof. Unless otherwise indicated, the alkyl groups typically contain from 1 to 20 carbon atoms. In some embodiments, the alkyl groups contain 1 to 10 carbon atoms, 1 to 6 carbon atoms, 1 to 5 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 20 carbon atoms. In some embodiments, the alkylene group has 1 to 10 carbon atoms, 1 to 6 carbon atoms, 1 to 5 carbon atoms, 1 to 4 carbon atoms, or 1 to 3 carbon atoms. Examples of "alkylene" groups include methylene, ethylene, propylene, 1,4-butylene, 1,4-cyclohexylene, and 1,4-cyclohexyldimethylene.

The phrase "alkylene optionally including catenary oxygen" refers to refers to one or more (nonperoxidic) oxygen atoms that replaces at least one carbon atom (usually a —$CH_2$— group) in a carbon chain in an alkylene group. The catenary oxygen is between two carbon atoms in the chain.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 20 carbon atoms. In some embodiments, the aryl groups contain 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms, and an aryl portion often has 6 to 20 carbon atoms, 6 to 18 carbon atoms, 6 to 16 carbon atoms, 6 to 12 carbon atoms, or 6 to 10 carbon atoms.

A "carboxylate" group is of the formula $-CO_2^-$.
A "sulfonate" group is of the formula $-SO_3^-$.
A "phosphonate" group is of the formula $-PO_3H^-$ or $-PO_3^{2-}$.
A "phosphate" group is of the formula $-PO_4H^-$ or $-PO_4^{2-}$.
A "phosphonic acid" group is of the formula $-PO_3H_2$.
A "phosphoric acid" group is of the formula $-PO_4H_2$.

The term "zwitterionic copolymer" is a neutral copolymer that has electrical charges of opposite sign within a molecule, as described in http://goldbook.iupac.org/Z06752.html.

A coating composition of the present disclosure may be in a "ready-to-use" form or a "concentrated" form. Herein, a "ready-to-use" composition is one that is not diluted before coating or otherwise applied to a surface. In contrast, a "concentrated" composition is one that is diluted before coating or otherwise applied to a surface. Dilutions typically seen are 1:1 to 1:500, wherein 1 part of concentrate is added to 1 part water (or up to 500 parts water).

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one R group is present in a formula, each R group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Provided herein are zwitterionic copolymers that include phosphonic acid, phosphonate, phosphoric acid, and/or phosphate end groups, compositions and articles containing such copolymers, and methods of coating a surface. The method of coating is preferably a method of protecting (e.g., against fingerprints and cooking oil), and optionally cleaning and protecting, a surface.

Such copolymers are particularly useful for protecting a surface, especially a metal surface (i.e., metallic surface), particularly stainless steel, such as on kitchen appliances. Thus, in certain embodiments, the zwitterionic copolymer can be used to form a hardened coating on a metal surface to protect the surface. Typically, such hardened coating can be prepared by simply applying a coating composition including such copolymer, and water, an organic solvent, or both, to a metal surface, and allowing the coating composition to dry (thereby allowing water, organic solvent, or both to evaporate).

Thus, the zwitterionic copolymer and coating compositions that include such copolymer may provide one or more of the following advantages: (1) the resultant coated metal surfaces attract less dirt (e.g., fingerprints, vegetable oil) than control or non-coated surfaces; (2) when dirt does collect, the coated metal surfaces can be more easily cleaned (e.g., using a simple wet cloth, water wash, or water dipping depending upon the harshness of the grime); and (3) the coated metal surfaces may not display an unsightly chalky residue from build-up of the coating.

Advantageously, in certain embodiments, a hardened coating on a surface (e.g., a metal surface such as a stainless-steel surface) formed from a coating composition including a copolymer of the present disclosure demonstrates at least 50% peanut oil removal according to the Peanut Oil Removal Test described in the Examples Section. This test demonstrates the easy-clean properties provided by the zwitterionic copolymers described herein, which can potentially reduce the time required to clean stainless-steel surfaces in commercial areas, reduce the accumulation rate of soils on said surfaces, and improve overall function and appearance.

In certain embodiments, a hardened coating on a surface (e.g., a metal surface such as a stainless-steel surface) formed from a coating composition including a copolymer of the present disclosure, after being abraded according to the Coating Durability Test described in the Examples Section, demonstrates at least 50% peanut oil removal according to the Peanut Oil Removal Test described in the Examples Section. It is believed that such durability can occur, for example, through attachment between the phosphonic acid, phosphonate, phosphoric acid, and/or phosphate end groups of the zwitterionic copolymer and the metal surface. This test demonstrates longer easy-clean properties provided by the zwitterionic copolymers described herein, preferably with less frequent re-application.

Zwitterionic Copolymers

In one aspect of the disclosure, a copolymer is disclosed that includes: (a) first monomeric units derived from monomers of Formula (I)

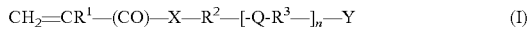

or salts thereof, wherein: $R^1$ is hydrogen or methyl; X is oxy or —NH—; $R^2$ is an alkylene optionally including catenary oxygen; $R^3$ is an alkylene; Q is —(CO)O—, —NR$^4$—(CO)—NR$^4$—, or —(CO)—NR$^4$—; $R^4$ is hydrogen or alkyl; n is equal to 0 or 1; and Y is phosphonic acid, phosphonate, phosphoric acid, or phosphate; and (b) second monomeric units derived from monomers of Formula (II)

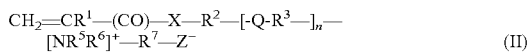

wherein: $R^1$ is hydrogen or methyl; X is oxy or —NH—; $R^2$ is alkylene optionally including catenary oxygen; $R^3$ is alkylene; Q is —(CO)O—, —NR$^4$—(CO)—NR$^4$—, or —(CO)—NR$^4$—; $R^4$ is hydrogen or alkyl; n is equal to 0 or 1; $R^5$ and $R^6$ are each independently an alkyl, aryl, or a combination thereof (i.e., alkaryl or aralkyl), or $R^5$ and $R^6$ both combine with the nitrogen to which they are both attached to form a heterocyclic ring having 3 to 7 ring members; $R^7$ is alkylene; and $Z^-$ is carboxylate or sulfonate.

In certain embodiments, the copolymer is a random copolymer, which may include one or more monomeric units derived from the same or different monomers of Formula (I) and one or more monomeric units derived from the same or different monomers of Formula (II) as well as one or more optional monomers.

In certain embodiments of Formula (I), $R^2$ is a (C1-C10) alkylene, a (C1-C5)alkylene, or a (C1-C3)alkylene, optionally including 1-3 catenary oxygen atoms. In certain embodiments of Formula (I), $R^2$ is a (C1-C10)alkylene, a (C1-C5)alkylene, or a (C1-C3)alkylene (with no catenary oxygen atoms). In certain embodiments of Formula (I), $R^2$ is a (C1-C3)alkylene.

In certain embodiments of Formula (I), $R^3$ is a (C1-C10) alkylene, a (C1-C5)alkylene, or a (C1-C3)alkylene. In certain embodiments of Formula (I), $R^3$ is a (C1-C3)alkylene.

In certain embodiments of Formula (I), $R^4$ is a (C1-C10) alkyl, a (C1-C5)alkyl, or a (C1-C3)alkyl. In certain embodiments of Formula (I), $R^4$ is a (C1-C3)alkyl.

In certain embodiments of Formula (I), Q is —NR$^4$—(CO)—NR$^4$— or —(CO)—NR$^4$—.

In certain embodiments of Formula (I), Y is phosphonate or phosphonic acid.

In certain embodiments, the monomers of Formula (I) are selected from:

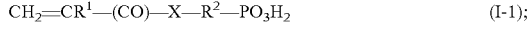

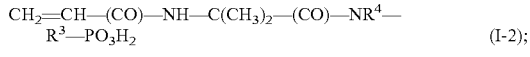

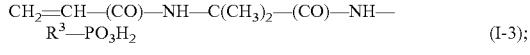

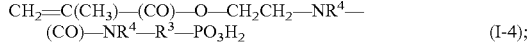

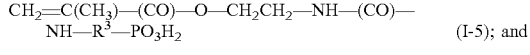

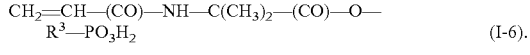

In certain embodiments of Formula (II), $R^2$ is a (C1-C10) alkylene, a (C1-C5)alkylene, or a (C1-C3)alkylene, optionally including 1-3 catenary oxygen atoms. In certain embodiments of Formula (II), $R^2$ is a (C1-C10)alkylene, a (C1-C5)alkylene, or a (C1-C3)alkylene (with no catenary oxygen atoms). In certain embodiments of Formula (II), $R^2$ is a (C1-C3)alkylene.

In certain embodiments of Formula (II), $R^3$ is a (C1-C10) alkylene, a (C1-C5)alkylene, or a (C1-C3)alkylene. In certain embodiments of Formula (II), $R^3$ is a (C1-C3)alkylene.

In certain embodiments of Formula (II), $R^4$ is a (C1-C10) alkyl, a (C1-C5)alkyl, or a (C1-C3)alkyl. In certain embodiments of Formula (II), $R^4$ is a (C1-C3)alkyl.

In certain embodiments of Formula (II), $R^5$ and $R^6$ are each independently a (C1-C10)alkyl, a (C1-C5)alkyl, or a (C1-C3)alkyl. In certain embodiments of Formula (II), $R^5$ and $R^6$ are each independently a (C1-C3)alkyl.

In certain embodiments of Formula (II), $R^5$ and $R^6$ are each independently a (C6-C10)aryl.

In certain embodiments of Formula (II), $R^5$ and $R^6$ are each independently an alkaryl or aralkyl. In certain embodiments of Formula (II), $R^5$ and $R^6$ are each independently an aralkyl. In certain embodiments of Formula (II), $R^5$ and $R^6$ are each a benzyl group.

In certain embodiments of Formula (II), $R^5$ and $R^6$ both combine with the nitrogen to which they are both attached to form a heterocyclic ring having 3 to 7 ring members. The term "heterocyclic ring" means a cyclic aliphatic group having at least one —CH$_2$— replaced with a heteroatom such as NR$^d$, O, or S, wherein Rd is H or an alkyl group (typically a (C1-C3)alkyl group).

In certain embodiments of Formula (II), $R^7$ is alkylene is a (C1-C10)alkylene, a (C1-C5)alkylene, or a (C1-C3)alkylene. In certain embodiments of Formula (II), $R^7$ is alkylene is a (C1-C3)alkylene.

In certain embodiments of Formula (II), Q is —NR$^4$—(CO)—NR$^4$— or —(CO)—NR$^4$—.

In certain embodiments, the monomers of Formula (II) are selected from:

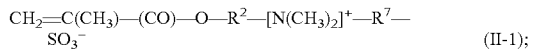

(II-1);

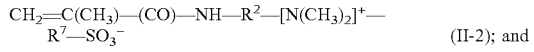

(II-2); and

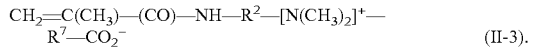

(II-3).

In certain embodiments, the copolymer includes 0.1 to 50 mole percent first monomeric units derived from monomers of Formula (I) and 50 to 99 mole percent second monomeric units derived from monomers of Formula (II). In certain embodiments, the copolymer includes 1 to 50 mole percent first monomeric units derived from monomers of Formula (I) and 50 to 99 mole percent second monomeric units derived from monomers of Formula (II). In certain embodiments, the copolymer includes 1 to 20 mole percent first monomeric units derived from monomers of Formula (I) and 80 to 99 mole percent second monomeric units derived from monomers of Formula (II).

In certain embodiments, the copolymer includes at least two, at least four, or at least six monomeric units derived from monomers of Formula (I), which may be the same or different.

In certain embodiments, the copolymer has a theoretical (i.e., estimated) weight average molecular weight (Mw) of at least 2,000 Daltons, at least 5,000 Daltons, or at least 10,000 Daltons. In certain embodiments, the copolymer has a theoretical weight average molecular weight (Mw) of up to 200,000 Daltons, up to 500,000 Daltons, or even more. The theoretical weight average molecular weight may be determined by standard techniques including theoretical techniques (e.g., by evaluating a decreasing integration of acrylate peaks corresponding to the starting monomers in NMR analysis).

In certain embodiments, the copolymer further includes 0 to 40 mole percent of optional third monomeric units. In certain embodiments, the third monomeric units are derived from an alkyl (meth)acrylate, a poly(alkylene oxide) (meth)acrylate, or a mixture thereof. In this context, a (meth)acrylate includes an acrylate and a methacrylate. Such monomers are preferred over readily available vinyl phosphate monomers, at least because the use of the latter in combination with the zwitterionic (meth)acrylate monomers disclosed herein may result in a blocky copolymer rather than one that is random because vinyl monomers do not polymerize as readily as (meth)acrylate monomers.

In certain embodiments, the copolymer is derived from polymerization of monomers of Formula (I) and Formula (II) in the presence of an initiator, such as a photoinitiator or a thermal initiator. Preferred initiators are thermal initiators.

In some embodiment, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof, an oxidation-reduction initiator such as the reaction product of a persulfate and a reducing agent such as a metabisulfite (e.g., sodium metabisulfite) or a bisulfate (e.g., sodium bisulfate); 4,4'-azobis(4-cyanopentanoic acid) and its soluble salts (e.g., sodium or potassium); or 4,4'-azobis(4-cyanovaleric acid) and its soluble salts (e.g., sodium or potassium). Suitable oil-soluble initiators include, but are not limited to, various azo compound such as those commercially available under the trade designation VAZO from E.I. DuPont de Nemours Co., (Wilmington, Del.) including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, and lauroyl peroxide. Mixtures of various thermal initiators may be used if desired.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), 2-hydroxy-2-methyl-1-phenyl propan-1-one (DAROCUR 1173), methyl 2,2-bis (isopropoxycarbothioylsulfanyl)acetate, and others disclosed in WO 2018/013330 (3M Innovative Properties, St. Paul, Minn.). Mixtures of photoinitiators may be used if desired.

In certain embodiments, an initiator (thermal initiator or photoinitiator) is used in an amount of at least 0.01 mole-%, at least 0.05 mole-%, or at least 0.1 mole-%, based on total moles of monomers. In certain embodiments, an initiator is used in an amount of up to 10 mole-%, 9 mole-%, up to 8 mole-%, or up to 7 mole-%, based on total moles of monomers.

The polymerizable mixture may optionally further contain a chain transfer agent to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent, based on a total weight of polymerizable material. For example, the polymerizable mixture can contain 0.01 weight percent (wt-%) to 0.5 wt-%, 0.05 wt-% to 0.5 wt-%, or 0.05 wt-% to 0.2 wt-% chain transfer agent.

Copolymers of the present disclosure can be made using standard techniques including thermal or radiation chain-growth polymerization.

Coating Compositions

In another aspect of the disclosure, a coating composition is provided that includes the copolymer described herein. Such coating composition is in liquid form, and is preferably a solution. In certain embodiments, the coating composition is preferably an aqueous coating composition, and more preferably an aqueous solution. As used herein, the term "aqueous coating composition" (or simply "aqueous composition") refers to a composition containing water. Such compositions are typically solutions and may employ water as the only solvent or liquid carrier, or they may employ combinations of water and organic solvents such as alcohol and acetone to improve, for example, freeze-thaw stability.

Significantly, such coating compositions (preferably, aqueous coating compositions) are desirable because they include a copolymer that provides both a zwitterionic moiety that provides easy cleaning capability and phosphonic acid, phosphonate, phosphoric acid, and/or phosphate end groups that provides attachment to a metal surface.

In any one composition, a mixture of zwitterionic copolymers could be used if desired.

In certain embodiments, the copolymer is present in an amount of at least 0.001 weight percent (wt-%), at least 0.01 wt-%, at least 0.1, or at least 1 wt-%, based on a total weight of the composition. In certain embodiments, the copolymer is present in an amount of up to 50 wt-%, up to 25 wt-%, up to 10 wt-%, up to 5 wt-%, up to 2 wt-%, up to 1 wt-%, or up to 0.1 wt-%, based on the total weight of the composition.

Coating compositions of the present disclosure are preferably applied out of water, an organic solvent, or both using a ready-to-use composition. A concentrated coating composition may need to be diluted, typically with water, to form a ready-to-use coating composition. Thus, coating compositions of the present disclosure can be supplied as both ready-to-use products, concentrates, or as part of a grease management system.

In certain embodiments, the coating composition (preferably, aqueous coating composition) is a ready-to-use composition and the copolymer is present in an amount of 0.001 wt-% to 0.1 wt-%, based on a total weight of the coating composition.

In certain embodiments, the coating composition (preferably, aqueous coating composition) is a concentrated composition and the copolymer is present in an amount of 1 wt-% to 2 wt-%, based on the total weight of the coating composition.

Compositions of the present disclosure may be provided in a variety of viscosities. Thus, for example, the viscosity may vary from a water-like thinness to a paste-like heaviness. They may also be provided in the form of gels, solids, or powders.

In certain embodiments, coating compositions (preferably, aqueous coating compositions) of the present disclosure may further include one or more optional additives, as long as they do not cause the zwitterionic polymer to precipitate out of solution. Exemplary additives include organic solvents, surfactants, alkalinity sources, water conditioning agents, bleaching agents, dyes, fragrances, corrosion inhibitors, enzymes, thickeners, wetting and leveling agents, adhesion promoters, or combinations thereof. Sodium chloride may also be included in the coating compositions if the copolymer is used in situ, as this may be used to solubilize the monomers.

In certain embodiments, a coating composition as described herein forms a hardened coating on a surface (e.g., a metal surface such as a stainless-steel surface) that demonstrates: at least 50% peanut oil removal according to the Peanut Oil Removal Test as described in the Examples Section; at least partial removal of fingerprints according to the Fingerprint Removal Test as described in the Examples Section; or at least partial removal of vegetable oil according to the Vegetable Oil Removal Test as described in the Examples Section.

In certain embodiments, a coating composition as described herein forms a hardened coating on a surface (e.g., a metal surface such as a stainless-steel surface) that, after being abraded according to the Coating Durability Test, demonstrates at least 50% peanut oil removal according to the Peanut Oil Removal Test.

One or more of the optional additives described herein may also function as cleaning agents (e.g., organic solvents, surfactants, and alkalinity sources). Compositions that include one or more of such cleaning agents (in combination with a copolymer as of the present disclosure) are capable of cleaning a surface (e.g., removing at least 90% vegetable oil from a stainless-steel panel according to the Clean and Protect Testing Procedure described in the Examples Section) without diminishing the protective capability provided by the copolymer.

Organic Solvents

Certain embodiments of coating compositions, which may be aqueous coating compositions, may include one or more organic solvents. These may be added to assist in solubilizing components and/or to enhance the cleaning capability of a composition.

Representative solvents and solvent systems may include one or more different solvents including acetone, aliphatic or aromatic alcohols, alkanol amines, ether amines, esters, and mixtures thereof. Exemplary solvents may include acetone, acetamidophenol, acetanilide, acetophenone, 2-acetyl-1-methylpyrrole, benzyl acetate, benzyl alcohol, methyl benzyl alcohol, alpha phenyl ethanol, trifluoro ethanol, benzyl benzoate, benzyloxyethanol, ethylene glycol phenyl ether (commercially available as DOWANOL EPh from Dow Chemical Co., Midland, Mich.), propylene glycol phenyl ether (commercially available as DOWANOL PPh from Dow Chemical Co.), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-I-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

In some embodiments, compositions of the present disclosure include alcohol and/or other organic solvents in an amount of at least 0.01 wt-%, and often at least 2 wt-%, based on the total weight of a ready-to-use composition. In some embodiments, compositions of the present disclosure include alcohol and/or other organic solvents in an amount of up to 50 wt-%, and often up to 25 wt-%, based on the total weight of a ready-to-use composition.

In some embodiments, compositions of the present disclosure include alcohol and/or other organic solvents in an amount of at least 1 weight percent (wt-%), and often at least 10 wt-%, based on the total weight of a concentrated composition. In some embodiments, compositions of the present disclosure include alcohol and/or other organic solvents in an amount of up to 90 wt-%, and often up to 60 wt-%, based on the total weight of a concentrated composition.

Optional Surfactants

Compositions of the present disclosure can also include one or more surfactants. Surfactants are particularly desirable for use in cleaning compositions. A variety of surfactants may be used in a composition, such as anionic, nonionic, cationic, and zwitterionic surfactants. Suitable surfactants that may be used are commercially available from a number of sources. For a discussion of suitable surfactants, see Kirk-Othmer, Encyclopedia of Chemical Technology, Third Edition, volume 8, pages 900-912.

Nonionic surfactants include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the tradename PLURONIC (BASF-Wyandotte), and the like; and other like nonionic compounds. Silicone surfactants such as those available under the tradename ABIL B8852 can also be used.

Preferred surfactants are any of a broad variety of nonionic ethylene oxide (EO) containing surfactants. Many nonionic ethylene oxide derivative surfactants are water soluble and have cloud points below the intended use temperature of the compositions of the present disclosure. In addition, where the composition is preferred to be biodegradable, the defoamers are also selected to be biodegradable.

Some examples of ethylene oxide derivative surfactants that may be used in compositions of the present disclosure include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

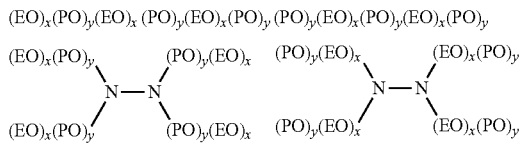

wherein EO represents an ethylene oxide group, PO represents a propylene oxide group, and x and y reflect the average molecular proportion of each alkylene oxide monomer in the overall block copolymer composition. In some embodiments, x is in the range of 10 to 130, y is in the range of 15 to 70, and x plus y is in the range of 25 to 200. It should be understood that each x and y in a molecule may be different. In some embodiments, the total polyoxyethylene component of the block copolymer may be at least 20 mole percent (mol-%) of the block copolymer and in some embodiments, at least 30 mol-% of the block copolymer. In some embodiments, the material may have a molecular weight greater than 400, and in some embodiments, greater than 500. For example, in some embodiments, the material may have a molecular weight (e.g., weight average molecular weight) in the range of 500 to 7000 Daltons or more, or in the range of 950 to 4000 Daltons or more, or in the range of 1000 to 3100 Daltons or more, or in the range of 2100 to 6700 Daltons or more.

Although the exemplary polyoxyethylene-polyoxypropylene block copolymer structures provided herein have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that may be used according to the present disclosure may be characterized as heteropolyoxyethylene-polyoxypropylene block copolymers. Some examples of suitable block copolymer surfactants include commercial products such as those surfactants available under the tradenames PLURONIC and TETRONIC from BASF. For example, PLURONIC 25-R4 is one example of a useful block copolymer surfactant commercially available from BASF, that is biodegradable and GRAS (generally recognized as safe).

Suitable anionic surfactants include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Exemplary anionic surfactants include sodium alkylarylsulfonate, alpha-olefinsulfonate, and fatty alcohol sulfates.

Suitable cationic surfactants include, for example, amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant may be used to provide sanitizing properties. Suitable zwitterionic surfactants include, for example, betaines, imidazolines, and propionates.

In some embodiments, compositions of the present disclosure include a surfactant in an amount of at least 0.001 wt-%, or at least 0.01 wt-%, or at least 0.1 wt-%, or at least 1 wt-%, or at least 2 wt-%, or at least 3 wt-%, based on the total weight of a ready-to-use composition. In some embodiments, compositions of the present disclosure, include a surfactant in an amount of up to 10 wt-%, or up to 5 wt-%, or up to 3 wt-%, or up to 1 wt-%, based on the total weight of a ready-to-use composition.

In some embodiments, compositions of the present disclosure include a surfactant in an amount of at least 0.001 wt-%, or at least 1 wt-%, or at least 5 wt-%, or at least 10 wt-%, based on the total weight of a concentrated composition. In some embodiments, compositions of the present disclosure, include a surfactant in an amount of up to 50 wt-%, or up to 20 wt-%, or up to 10 wt-%, or up to 5 wt-%, based on the total weight of a concentrated composition.

Optional Alkalinity Sources

Certain embodiments of compositions of the present disclosure may include one or more alkalinity (i.e., alkaline) sources.

Examples of suitable alkaline sources for use in the compositions according to the present disclosure include amines and alkanol amines. For example, the source of alkalinity can include 2-(2-aminoethoxy) ethanol, monoethanolamine, diethanolamine, triethanolamine, mixed isopropanolamines, morpholine, N,N-dimethyl ethanolamine, and combinations thereof.

When a composition of the present disclosure includes an alkalinity source, it may be included in an amount of at least 0.01 wt-%, or at least 0.1 wt-%, or at least 1 wt-%, based on the total weight of a ready-to-use composition. When a composition of the present disclosure includes an alkalinity source, it may be included in an amount of up to 10 wt-%, or up to 5 wt-%, or up to 1 wt-%, based on the total weight of a ready-to-use composition.

When a composition of the present disclosure includes an alkalinity source, it may be included in an amount of at least 1 wt-%, or at least 5 wt-%, or at least 10 wt-%, based on the total weight of a concentrated composition. When a composition of the present disclosure includes an alkalinity source, it may be included in an amount of up to 40 wt-%, or up to 30 wt-%, or up to 10 wt-%, based on the total weight of a concentrated composition.

Optional Water Conditioning Agents

Certain embodiments of compositions of the present disclosure may include one or more water conditioning agents. Water conditioning agents aid in removing metal compounds and in reducing harmful effects of hardness components in service water. Exemplary water conditioning agents include chelating agents, sequestering agents, and inhibitors. Polyvalent metal cations or compounds such as a calcium, a magnesium, an iron, a manganese, a molybdenum, etc., cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the present disclosure.

Organic water conditioning agents are common and can be used. Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. Small molecule organic water conditioning agents include, but are not limited to, sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium, and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N—N-diacetic acid trisodium salt (MGDA), and iminodisuccinate sodium salt (IDS). Suitable water conditioning agents are commercially available.

When a composition of the present disclosure includes a water conditioning agent, it may be included in an amount of at least 0.001 wt-%, or at least 0.01 wt-%, or at least 0.1 wt-%, based on the total weight of a ready-to-use composition. When a composition of the present disclosure includes a water conditioning agent, it may be included in an amount of up to 1 wt-%, or up to 0.5 wt-%, or up to 0.1 wt-%, or up to 0.01 wt-%, based on the total weight of a ready-to-use composition.

When a composition of the present disclosure includes a water conditioning agent, it may be included in an amount of at least 0.01 wt-%, or at least 0.1 wt-%, or at least 1 wt-%, based on the total weight of a concentrated composition. When a composition of the present disclosure includes a water conditioning agent, it may be included in an amount of up to 40 wt-%, or up to 20 wt-%, or up to 10 wt-%, or up to 5 wt-%, based on the total weight of a concentrated composition.

Optional Bleaching Agents

Certain embodiments of compositions of the present disclosure may include one or more bleaching agents. Bleaching agents may be included for lightening or whitening a substrate.

Examples of suitable bleaching agents include bleaching compounds capable of liberating an active halogen species (such as $Cl_2$, $Br_2$, $OCl^-$, and/or $OBr^-$) under conditions typically encountered during the cleansing process. Suitable bleaching agents for use in the present compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. No. 4,830,773 (Olson)). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like.

When a composition of the present disclosure includes a bleaching agent, it may be included in an amount of at least 0.1 wt-%, or at least 1 wt-%, or at least 3 wt-%, based on the total weight of a ready-to-use composition. When a composition of the present disclosure includes a bleaching agent, it may be included in an amount of up to 60 wt-%, or up to 20 wt-%, or up to 8 wt-%, or up to 6 wt-%, based on the total weight of a ready-to-use composition.

When a composition of the present disclosure includes a bleaching agent, it may be included in an amount of at least 0.1 wt-%, or at least 1 wt-%, or at least 3 wt-%, based on the total weight of a concentrated composition. When a composition of the present disclosure includes a bleaching agent, it may be included in an amount of up to 60 wt-%, or up to 20 wt-%, or up to 8 wt-%, or up to 6 wt-%, based on the total weight of a concentrated composition.

Other Optional Additives

Certain embodiments of compositions of the present disclosure may include one or more other additives. Suitable additives according to the present disclosure may include, for example, dyes (product safety/identification), fragrances, corrosion inhibitors, enzymes, wetting and leveling agents, adhesion promoters, and/or thickeners. Suitable thickeners may include, for example, gums (e.g., xanthan, carrageenan, etc.) and polymers (e.g., polyacrylates and similar modified polymers).

Various additional additives suitable for use according to the present disclosure are disclosed in U.S. Pat. No. 6,916,773 (Griese et al.) and U.S. Pat. No. 8,772,215 (Ryther et al.), and U.S. Pat. App. Pub. Nos. 2010/0317559 (Ryther et al.), 2012/0295829 (Peitersen et al.), and 2013/0023458 (Hodge et al.).

Articles

In another aspect of the disclosure, an article is provided that includes a substrate and a coating adjacent to the substrate, wherein the coating includes a copolymer as described herein.

In certain embodiments, the substrate has a surface including a metal and the coating is a hardened coating thereon. Herein, a "metal surface" refers to a surface that includes elemental metals or alloys of metals. The term also includes surface oxides of such elemental metal or alloy. This term does not include bulk oxides, such as alumina, silica, etc.

In certain embodiments, the metal surface includes stainless steel, aluminum, anodized aluminum, titanium, zinc, silver, a surface oxide thereof, or a combination thereof. In certain embodiments, the metal surface includes stainless steel.

In certain embodiments, the metal surface forms at least a portion of an article including those in a home or commercial kitchen (e.g., refrigerator, dishwasher, stove, oven, microwave, exhaust hoods, fryers, grease traps, food-preparation tables, cabinets), in a restroom (e.g., toilet stall partitions, urinal partitions). Examples of such articles also include decorative or functional wall cladding such as in/on an elevator or escalator, walls in airports, hospitals, subway stations, train stations, malls, or in other commercial buildings. Examples of such articles also include decorative or functional panels in an automobile (e.g., decorative metallic parts in a car interior). Examples of such articles include consumer electronics, such as metal cases for electronic article (e.g., phones, tablets, and computers). Examples of such articles also include manufacturing equipment, and tools.

In certain embodiments, a hardened coating is less than 2 microns, less than 1 micron, or less than 100 nanometers (nm) thick. Typically, the thickness of the coating is self-limiting, such that it is only a monolayer thick, particularly if the coating is attached to the surface and the excess is removed. In certain embodiments, the hardened coating is at least 10 nm thick.

In certain embodiments, the substrate is flexible, such as a fibrous substrate. In certain embodiments, the fibrous substrate includes a polymeric material (i.e., polymeric fibers). In certain embodiments, the polymeric fibers include cellulose fibers, rayon fibers, cotton fibers, polyamide fibers, polyacrylic acid fibers, polyurethane fibers, polypropylene fibers, polyethylene fibers, polyethylene terephthalate fibers, or combinations thereof. In certain embodiments, the polymeric fibers include cellulose fibers, and the substrate is paper.

Such articles that include a flexible substrate preferably have a coating composition (which is in a liquid state) thereon. In certain embodiments, the substrate includes a fibrous material, which, for example, forms a wipe. In such embodiment, the coating adjacent the substrate may be a liquid coating composition (e.g., aqueous coating composition) impregnated within the fibrous substrate.

Methods

In another aspect, the present disclosure provides a method of coating a surface (e.g., metallic surface as described herein), the method includes: providing a coating composition (a liquid coating composition, such as an aqueous coating composition) described herein; applying the coating composition to the surface; and allowing the coating composition to dry on the surface to form a hardened coating that includes the copolymer described herein.

A coating composition of the present disclosure may be applied to a substrate having a surface that includes a metal (i.e., a metallic surface) using a variety of techniques, including, for example, spraying, brushing, rolling, dipping, knife coating, die-coating, or combinations thereof. For cleaning a surface, contaminants may be removed by one of these methods, or additional wiping or scrubbing may be needed. The composition may be dried to form a hardened coating by simply letting the water and/or organic solvent evaporate, or by the application of heat, radiation, or a combination thereof.

In certain embodiments of a method of coating, providing a coating composition includes providing a wipe comprising a fibrous substrate having the coating composition impregnated therein; and applying the coating composition to the surface comprises wiping the coating composition on the surface.

In certain embodiments, the method of coating is a method of protecting a surface. That is, if there is a hardened coating of the copolymer on a surface (e.g., a metallic surface), the surface is protected such that it can be cleaned easily with water to remove oil and dirt.

Easy cleaning properties (i.e., protection) of surfaces having a copolymer of the present disclosure thereon is demonstrated by the Peanut Oil Removal Test, the Fingerprint Removal Test, or the Vegetable Oil Removal Test, all of which are described in the Examples Section.

For example, preferably a hardened coating on a surface (e.g., a metal surface such as a stainless-steel surface) formed from a coating composition including a copolymer of the present disclosure demonstrates at least 50% peanut oil removal according to the Peanut Oil Removal Test described in the Examples Section.

As another example of easy-clean performance (i.e., protection) of a surface coated with a copolymer of the present disclosure, a hardened coating on a surface (e.g., a metal surface such as a stainless-steel surface) formed from a coating composition including a copolymer of the present disclosure demonstrates at least partial removal of fingerprints according to the Fingerprint Removal Test described in the Examples Section.

As another example of easy-clean performance (i.e., protection) of a surface coated with a copolymer of the present disclosure, a hardened coating on a surface (e.g., a metal surface such as a stainless-steel surface) formed from a coating composition including a copolymer of the present disclosure demonstrates at least partial removal of vegetable oil according to the Vegetable Oil Removal Test described in the Examples Section.

In certain embodiments, such easy-clean performance also occurs using coating compositions that include one or more copolymers as described herein and one or more cleaning agents (e.g., surfactants, organic solvents, and alkalinity agents).

Significantly, although the copolymers described herein do not have cleaning capabilities themselves, they do not interfere with the cleaning performance of conventional cleaning agents (e.g., surfactants, organic solvents, and alkalinity agents). Furthermore, the cleaning agents do not interfere with the protective properties of the copolymers.

For example, a coating composition that includes a copolymer as described herein and a cleaning agent removes at least 90% vegetable oil from a surface (e.g., a metal surface such as a stainless-steel surface) according to the Clean and Protect Testing Procedure described in the Examples Section. And, a hardened coating on a surface (e.g., a metal surface such as a stainless-steel surface) formed from such coating composition demonstrates at least partial removal of fingerprints according to the Fingerprint Removal Test as described in the Examples Section, at least partial removal of vegetable oil according to the Vegetable Oil Removal Test as described in the Examples Section, or both.

Thus, in certain embodiments, the method of coating is a method of cleaning and protecting a surface, wherein providing a coating composition includes providing a coating composition including a copolymer as described herein and a cleaning agent, and applying the coating composition includes applying the coating composition to the surface under conditions effective to remove contaminants from the surface. In certain embodiments, the coating composition that includes the copolymer and a cleaning agent removes at least 90% vegetable oil from a surface (e.g., a metal surface such as a stainless-steel surface) according to the Clean and Protect Testing Procedure described in the Examples Section.

If wiped on an oily surface, the copolymer would generally replace the oil. The copolymer remaining on the surface protects the surface such that it is protected and can be subsequently cleaned easily. Thus, in certain embodiments, a hardened coating on a surface (e.g., a metal surface such as a stainless-steel surface) formed from the coating composition that includes the copolymer and a cleaning agent demonstrates at least partial removal of fingerprints according to the Fingerprint Removal Test, at least partial removal of vegetable oil according to the Vegetable Oil Removal Test, or both.

EMBODIMENTS

Embodiment 1 is a copolymer comprising:
(a) first monomeric units derived from monomers of Formula (I)

$$CH_2=CR^1-(CO)-X-R^2-[-Q-R^3-]_n-Y \qquad (I)$$

or salts thereof, wherein:
$R^1$ is hydrogen or methyl;
X is oxy or —NH—;
$R^2$ is an alkylene optionally including catenary oxygen;
$R^3$ is an alkylene;
Q is —(CO)O—, —$NR^4$—(CO)—$NR^4$—, or —(CO)—$NR^4$—;
$R^4$ is hydrogen or alkyl;
n is equal to 0 or 1; and
Y is phosphonic acid, phosphonate, phosphoric acid, or phosphate; and
(b) second monomeric units derived from monomers of Formula (II)

$$CH_2=CR^1-(CO)-X-R^2-[-Q-R^3-]_n- [NR^5R^6]^+-R^7-Z^- \qquad (II)$$

wherein:
$R^1$ is hydrogen or methyl;
X is oxy or —NH—;
$R^2$ is alkylene optionally including catenary oxygen;
$R^3$ is alkylene;
Q is —(CO)O—, —$NR^4$—(CO)—$NR^4$—, or —(CO)—$NR^4$—;
$R^4$ is hydrogen or alkyl;
n is equal to 0 or 1;
$R^5$ and $R^6$ are each independently an alkyl, aryl, or a combination thereof, or $R^5$ and $R^6$ both combine with the nitrogen to which they are both attached to form a heterocyclic ring having 3 to 7 ring members;
$R^7$ is alkylene; and
$Z^-$ is carboxylate or sulfonate.

Embodiment 2 is the copolymer of embodiment 1, wherein the copolymer is a random copolymer.

Embodiment 3 is the copolymer of embodiment 1 or 2, wherein the monomers of Formula (I) are of Formula (I-1)

$$CH_2=CR^1-(CO)-X-R^2-PO_3H_2 \qquad (I-1).$$

Embodiment 4 is the copolymer of embodiment 1 or 2, wherein the monomers of Formula (I) are of Formula (I-2)

$$CH_2=CH-(CO)-NH-C(CH_3)_2-(CO)-NR^4-R^3-PO_3H_2 \qquad (I-2).$$

Embodiment 5 is the copolymer of embodiment 4, wherein the monomers of Formula (I) are of Formula (I-3)

$$CH_2=CH-(CO)-NH-C(CH_3)_2-(CO)-NH-R^3-PO_3H_2 \qquad (I-3).$$

Embodiment 6 is the copolymer of embodiment 5, wherein $R^3$ of the monomers of Formula (I-3) is a (C1-C3) alkylene.

Embodiment 7 is the copolymer of embodiment 1 or 2, wherein the monomers of Formula (I) are of Formula (I-4)

$$CH_2=C(CH_3)-(CO)-O-CH_2CH_2-NR^4-(CO)-NR^4-R^3-PO_3H_2 \qquad (I-4).$$

Embodiment 8 is the copolymer of embodiment 7, wherein the monomers of Formula (I) are of Formula (I-5)

$$CH_2=C(CH_3)-(CO)-O-CH_2CH_2-NH-(CO)-NH-R^3-PO_3H_2 \qquad (I-5).$$

Embodiment 9 is the copolymer of embodiment 8, wherein $R^3$ of the monomers of Formula (I-5) is a (C1-C3) alkylene.

Embodiment 10 is the copolymer of embodiments 1 or 2, wherein the monomers of Formula (I) are of Formula (I-6)

$$CH_2=CH-(CO)-NH-C(CH_3)_2-(CO)-O-R^3-PO_3H_2 \qquad (I-6).$$

Embodiment 11 is the copolymer of embodiment 10, wherein $R^3$ of the monomers of Formula (I-6) is a (C1-C3) alkylene.

Embodiment 12 is the copolymer any one of embodiment 1 to 11, wherein the monomers of Formula (II) are of Formula (II-1)

$$CH_2=C(CH_3)-(CO)-O-R^2-[N(CH_3)_2]^+-R^7-SO_3^- \qquad (II-1).$$

Embodiment 13 is the copolymer of embodiment 12, wherein $R^2$ and $R^7$ of the monomers of Formula (II-1) is each independently a (C1-C3)alkylene.

Embodiment 14 is the copolymer any one of embodiment 1 to 11, wherein the monomers of Formula (II) are of Formula (II-2)

$$CH_2=C(CH_3)-(CO)-NH-R^2-[N(CH_3)_2]^+-R^7-SO_3^- \qquad (II-2).$$

Embodiment 15 is the copolymer of embodiment 14, wherein $R^2$ and $R^7$ of the monomers of Formula (II-2) is each independently a (C1-C3)alkylene.

Embodiment 16 is the copolymer any one of embodiment 1 to 11, wherein the monomers of Formula (II) are of Formula (II-3)

$$CH_2=C(CH_3)-(CO)-NH-R^2-[N(CH_3)_2]^+-R^7-CO_2^- \qquad (II-3).$$

Embodiment 17 is the copolymer of embodiment 16, wherein $R^2$ and $R^7$ of the monomers of Formula (II-3) is each independently a (C1-C3)alkylene.

Embodiment 18 is the copolymer of any one of embodiments 1 to 17, wherein the copolymer comprises 0.1 to 50 mole percent first monomeric units derived from monomers of Formula (I) and 50 to 99 mole percent second monomeric units derived from monomers of Formula (II).

Embodiment 19 is the copolymer of embodiment 18, wherein the copolymer comprises 1 to 20 mole percent first monomeric units derived from monomers of Formula (I) and 80 to 99 mole percent second monomeric units derived from monomers of Formula (II).

Embodiment 20 is the copolymer of any one of embodiments 1 to 19, wherein the copolymer comprises at least two monomeric units derived from monomers of Formula (I).

Embodiment 21 is the copolymer of embodiment 20, wherein the copolymer comprises at least four monomeric units derived from monomers of Formula (I).

Embodiment 22 is the copolymer of embodiment 21, wherein the copolymer comprises at least six monomeric units derived from monomers of Formula (I).

Embodiment 23 is the copolymer of any one of embodiments 1 to 22, wherein the copolymer further comprises 0 to 40 mole percent third monomeric units derived from an alkyl (meth)acrylate, a poly(alkylene oxide) (meth)acrylate, or a mixture thereof.

Embodiment 24 is the copolymer of any one of embodiments 1 to 23, wherein the copolymer has a theoretical weight average molecular weight (Mw) of at least 2,000 Daltons.

Embodiment 25 is the copolymer of embodiment 24, wherein the copolymer has a theoretical weight average molecular weight of at least 5,000 Daltons.

Embodiment 26 is the copolymer of embodiment 25, wherein the copolymer has a theoretical weight average molecular weight of at least 10,000 Daltons.

Embodiment 27 is the copolymer of any one of embodiments 1 to 26, wherein copolymer has a theoretical weight average molecular weight of up to 500,000 Daltons.

Embodiment 28 is the copolymer of embodiment 27, wherein copolymer has a theoretical weight average molecular weight of up to 200,000 Daltons.

Embodiment 29 is the copolymer of any one of embodiments 1 to 28, wherein the copolymer is derived from polymerization of monomers of Formula (I) and Formula (II) in the presence of a photoinitiator.

Embodiment 30 is the copolymer of embodiment 29, wherein the photoinitiator is selected from the group of benzoin ethers (e.g., benzoin methyl ether or benzoin isopropyl ether) or substituted benzoin ethers (e.g., anisoin methyl ether); substituted acetophenones such as 2,2-diethoxyacetophenone or 2,2-dimethoxy-2-phenylacetophenone; substituted alpha-ketols such as 2-methyl-2-hydroxypropiophenone; aromatic sulfonyl chlorides such as 2-naphthalenesulfonyl chloride; photoactive oximes such as 1-phenyl-1,2-propanedione-2-(O-ethoxycarbonyl)oxime; 1-hydroxycyclohexyl phenyl ketone; bis(2,4,6-trimethylbenzoyl)phenylphosphineoxide; 1-[4-(2-hydroxyethoxy)phenyl]-2-hydroxy-2-methyl-1-propane-1-one; 2-benzyl-2-dimethylamino-1-(4-morpholinophenyl)butanone; 2-methyl-1-[4-(methylthio)phenyl]-2-morpholinopropan-1-one; 2-hydroxy-2-methyl-1-phenyl propan-1-one; methyl 2,2-bis (isopropoxycarbothioylsulfanyl)acetate; and mixtures thereof.

Embodiment 31 is the copolymer of any one of embodiments 1 to 29, wherein the copolymer is derived from polymerization of monomers of Formula (I) and Formula (II) in the presence of a thermal initiator.

Embodiment 32 is the copolymer of embodiment 31, wherein the thermal initiator is selected from the group of persulfates such as potassium persulfate, ammonium persulfate, sodium persulfate, and mixtures thereof, an oxidation-reduction initiator such as the reaction product of a persulfate and a reducing agent such as a metabisulfite (e.g., sodium metabisulfite) or a bisulfate (e.g., sodium bisulfate); 4,4'-azobis(4-cyanopentanoic acid) and its soluble salts (e.g., sodium or potassium); 4,4'-azobis(4-cyanovaleric acid) and its soluble salts (e.g., sodium or potassium); 2,2'-azobis(2-methylbutane nitrile); 2,2'-azobis(isobutyronitrile); (2,2'-azobis(2,4-dimethylpentanenitrile); peroxides such as benzoyl peroxide, cyclohexane peroxide, lauroyl peroxide; and mixtures thereof.

Embodiment 33 is a coating composition (e.g., an aqueous coating composition) comprising the copolymer of any one of the previous embodiments.

Embodiment 34 is the coating composition of embodiment 33, wherein the copolymer is present in an amount of at least 0.001 wt-%, at least 0.01 wt-%, at least 0.1, or at least 1 wt-%, based on a total weight of the coating composition.

Embodiment 35 is the coating composition of embodiment 33 or 34, wherein the copolymer is present in an amount of up to 50 wt-%, up to 25 wt-%, up to 10 wt-%, up to 5 wt-%, up to 2 wt-%, up to 1 wt-%, or up to 0.1 wt-%, based on the total weight of the coating composition.

Embodiment 36 is the coating composition of any one of embodiments 33 to 35, wherein the coating composition is a ready-to-use composition and the copolymer is present in an amount of 0.001 wt-% to 0.1 wt-%, based on a total weight of the coating composition.

Embodiment 37 is the coating composition of any one of embodiments 33 to 35, wherein the coating composition is a concentrated composition and the copolymer is present in an amount of 1 wt-% to 2 wt-%, based on the total weight of the coating composition.

Embodiment 38 is the coating composition of any one of embodiments 33 to 37 further comprising one or more additives selected from the group of surfactants, organic solvents, alkalinity sources, water conditioning agents, bleaching agents, dyes, fragrances, corrosion inhibitors, enzymes, thickeners, wetting and leveling agents, adhesion promoters, and combinations thereof.

Embodiment 39 is the coating composition of any one of embodiments 33 to 38, wherein the coating composition has a variety of viscosities.

Embodiment 40 is the coating composition of any one of embodiments 33 to 39, wherein a hardened coating formed from the coating composition on a surface (e.g., a metal surface such as a stainless-steel surface) demonstrates:
at least 50% peanut oil removal according to the Peanut Oil Removal Test;
at least partial removal of fingerprints according to the Fingerprint Removal Test; or
at least partial removal of vegetable oil according to the Vegetable Oil Removal Test.

Embodiment 41 is the coating composition of any one of embodiments 33 to 40, wherein a hardened coating formed from the coating composition on a surface (e.g., a metal surface such as a stainless-steel surface), after being abraded according to the Coating Durability Test, demonstrates at least 50% peanut oil removal according to the Peanut Oil Removal Test.

Embodiment 42 is the coating composition of any one of embodiments 33 to 41, wherein the coating composition comprises the copolymer and a cleaning agent (e.g., surfactant, alkalinity source, organic solvent, or a combination thereof).

Embodiment 43 is the coating composition of embodiment 42 which removes at least 90% vegetable oil from a surface (e.g., a metal surface such as a stainless-steel surface) according to the Clean and Protect Testing Procedure.

Embodiment 44 is the coating composition of embodiment 42 or 43, wherein a hardened coating formed from the coating composition comprising the copolymer and a cleaning agent on a surface (e.g., a metal surface such as a stainless-steel surface) demonstrates at least partial removal of fingerprints according to the Fingerprint Removal Test.

Embodiment 45 is the coating composition any one of embodiments 42 to 44, wherein a hardened coating formed from the coating composition comprising the copolymer and a cleaning agent on a surface (e.g., a metal surface such as a stainless-steel surface) demonstrates at least partial removal of vegetable oil according to the Vegetable Oil Removal Test.

Embodiment 46 is an article comprising: a substrate; and a coating adjacent to the substrate, wherein the coating comprises a copolymer of any one of embodiments 1 to 32, or the coating is formed from a coating composition of any one of embodiments 33 to 45.

Embodiment 47 is the article of embodiment 46, wherein the substrate has a surface comprising a metal and the coating is a hardened coating thereon.

Embodiment 48 is the article of embodiment 47, wherein the metal surface comprises stainless steel, aluminum, anodized aluminum, titanium, zinc, silver, a surface oxide thereof, or a combination thereof.

Embodiment 49 is the article of embodiment 47 or 48, wherein the metal surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

Embodiment 50 is the article of any one of embodiments 46 to 49, wherein the coating is less than 2 microns, less than 1 micron, or less than 100 nm thick.

Embodiment 51 is the article of any one of embodiments 46 to 50, wherein the coating is at least a monolayer thick or at least 10 nm thick.

Embodiment 52 is the article of any one of embodiments 46 to 51, wherein the hardened coating demonstrates at least 50% peanut oil removal according to the Peanut Oil Removal Test.

Embodiment 53 is the article of any one of embodiments 46 to 52, wherein the hardened coating, after being abraded according to the Coating Durability Test, demonstrates at least 50% peanut oil removal according to the Peanut Oil Removal Test.

Embodiment 54 is the article of any one of embodiments 46 to 53, wherein the hardened coating demonstrates at least partial removal of fingerprints according to the Fingerprint Removal Test.

Embodiment 55 is the article of any one of embodiments 46 to 54, wherein the hardened coating demonstrates at least partial removal of vegetable oil according to the Vegetable Oil Removal Test.

Embodiment 56 is the article of embodiment 46, wherein the substrate is flexible.

Embodiment 57 is the article of embodiment 56, wherein the flexible substrate is a fibrous substrate.

Embodiment 58 is the article of embodiment 57, wherein the fibrous substrate comprises polymeric fibers.

Embodiment 59 is the article of embodiment 58, wherein the polymeric fibers comprise cellulose fibers, rayon fibers, cotton fibers, polyamide fibers, polyacrylic acid fibers, polyurethane fibers, polypropylene fibers, polyethylene fibers, polyethylene terephthalate fibers, or combinations thereof.

Embodiment 60 is the article of embodiment 59, wherein the polymeric fibers comprise cellulose fibers.

Embodiment 61 is the article of any one of embodiments 56 to 60, wherein the article is a wipe and the coating adjacent the substrate comprises a liquid (e.g., aqueous) coating composition impregnated within the fibrous substrate.

Embodiment 62 is a method of coating a surface, the method comprising: providing a coating composition (e.g., an aqueous coating composition) of any one of embodiments 33 to 45; applying the coating composition to the surface; and allowing the coating composition to dry on the surface to form a hardened coating comprising the copolymer of any one of embodiments 1 to 32.

Embodiment 63 is the method of embodiment 62, wherein: providing a coating composition comprises providing a wipe comprising a fibrous substrate having the coating composition impregnated therein; and applying the coating composition to the surface comprises wiping the coating composition on the surface.

Embodiment 64 is the method of embodiment 62 or 63, which is a method of protecting a surface.

Embodiment 65 is the method of embodiment 64, which is a method of cleaning and protecting a surface, wherein providing a coating composition comprises providing a coating composition comprising the copolymer and a cleaning agent, and applying the coating composition comprises applying the coating composition to the surface under conditions effective to remove contaminants from the surface.

Embodiment 66 is the method of embodiment 65, wherein the coating composition comprising the copolymer and a cleaning agent removes at least 90% vegetable oil from a surface (e.g., a metal surface such as a stainless-steel surface) according to the Clean and Protect Testing Procedure.

Embodiment 67 is the method of embodiment 65 or 66, wherein a hardened coating, formed from the coating composition comprising the copolymer and a cleaning agent, on a surface (e.g., a metal surface such as a stainless-steel surface) demonstrates at least partial removal of fingerprints according to the Fingerprint Removal Test.

Embodiment 68 is the method of any one of embodiments 65 to 67, wherein a hardened coating, formed from the coating composition comprising the copolymer and a cleaning agent, on a surface (e.g., a metal surface such as a stainless-steel surface) demonstrates at least partial removal of vegetable oil according to the Vegetable Oil Removal Test.

Embodiment 69 is the method of any one of embodiments 62 to 68, wherein the surface comprises a metal.

Embodiment 70 is the method of embodiment 69, wherein the metal surface comprises stainless steel, aluminum, anodized aluminum, titanium, zinc, silver, a surface oxide thereof, or a combination thereof.

Embodiment 71 is the method of embodiment 70, wherein the metal surface forms at least a portion of an article selected from a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, and a tool.

EXAMPLES

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the examples and the rest of the specification are by weight, and all reagents used in the examples were obtained, or are available, from general chemical suppliers such as, for example, Sigma-Aldrich, Saint Louis, Mo., or may be synthesized by conventional methods. The following abbreviations may be used in this section: mL=milliliter, L=liter, sec=seconds, min=minutes, h=hours, in=inches, cm=centimeters, g=gram, mg=milligram, gsm=grams per square meter, rpm=revolutions per minute, Da=Daltons, mol=mole, mmol=millimole, rC=degrees Celsius, °F.=degrees Fahrenheit.

TABLE 1

Materials

| Description (Abbreviation) | Source |
| --- | --- |
| Bromotrimethylsilane (TMSBr) | Alfa Aesar, Ward Hill, MA |
| 2,2,2-Trifluoroethanol (TFE) | Alfa Aesar, Ward Hill, MA |

TABLE 1-continued

Materials

| Description (Abbreviation) | Source |
| --- | --- |
| 4-Dimethylaminopyridine (DMAP) | Alfa Aesar, Ward Hill, MA |
| Triethylamine (TEA) | EMD, Burlington, MA |
| Hydroxyethylphosphonate dimethyl ester | Tokyo Chemical Industry Co., Portland, OH |
| N-[3-(Dimethylamino)propyl]acrylamide | Tokyo Chemical Industry Co., Portland, OH |
| Acryloyl chloride | Sigma Aldrich, St. Louis, MO |
| [2-(Methacryloyloxy)ethyl]-dimethyl-(3-sulfopropyl)ammonium hydroxide (SulfoO ZW) | Sigma Aldrich, St. Louis, MO |
| [3-(Methacryloylamino)propyl]dimethyl(3-sulfopropyl)ammonium hydroxide (SulfoNH ZW) | Sigma Aldrich, St. Louis, MO |
| Ethyl bromoacetate | Sigma Aldrich, St. Louis, MO |
| Diazabicycloundecene (DBU) | Alfa Aesar, Ward Hill, MA |
| Vinyldimethylazlactone (VDM) | SNPE, Inc, Princeton, NJ |
| 2-Isocyanatoethyl methacrylate (IEM) | Showa Denko KK, Kanagawa, Japan |
| 3-Aminopropylphosphonic acid | Oakwood Chemicals, Estill, SC |
| 4,4'-Azobis(4-cyanovaleric acid) (ACPA) | Pfaltz & Bauer, Waterbury, CT |
| IRGACURE 651 | BASF |
| Methyl 2,2-bis (isopropoxycarbothioylsulfanyl)acetate | Prepared as described in Photoinitiator Example 2 of WO 2018/013330 |
| KIMTECH Kimwipe | Kimberly-Clark Corp. Irving, TX |
| Spuntech 80 gsm SQ VIS 30% PET (polyethylene terephthalate) 70% wipe | Spuntech Industries, Inc., Roxboro, NC |
| SCOTCHBRITE 96 Pad | 3M Co, St. Paul, MN |
| SCOTCHBRITE 98 Pad | 3M Co, St. Paul, MN |
| BIOSOFT S101 (anionic surfactant) | Stepan, Northfield, IL |
| Benzyl alcohol | Nexeo Solution of The Woodlands, TX |
| Monoethanolamine | Ineos Oxide of Houston, TX |
| TOMADOL 91-6 (nonionic surfactant) | Air Products and Chemicals Inc, Allentown, PA |
| Stainless steel, 304C, deburred | McMaster Carr, Elmhurst, IL |
| Anodized Aluminum 6061 | McMaster Carr, Elmhurst, IL |

Monomer Preparation

Monomer Example A (Intermediate for Monomer Example B)

[2-(Acryloyloxy)ethyl]phosphonate dimethyl ester

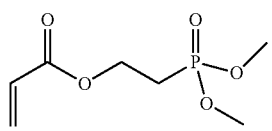

Hydroxyethylphosphonate dimethyl ester (5.0 g, 0.013 mol) was added to a 100-mL round bottom flask. Methylene chloride (50 mL) was added to the flask and the resulting mixture was stirred. TEA (4.5 mL, 0.013 mol) and DMAP (catalytic amount) were added and the mixture was stirred until the solids dissolved. The flask was then placed in an ice-water bath and stirred for 15 min under a nitrogen flow. Acryloyl chloride (2.6 g, 0.013 mol) was added dropwise by syringe with the flask continuously maintained in the ice-water bath and under a nitrogen atmosphere. The reaction was stirred overnight. The next day, the reaction mixture was diluted with 60 mL of methylene chloride, quenched with saturated sodium bicarbonate and the two phases were separated. The aqueous portion was extracted with two more portions of methylene chloride. The organic phases were combined and washed twice with a 500 aqueous solution of monosodium phosphate, followed by washing with water and finally brine. The organic portion was dried over sodium sulfate, filtered and concentrated under reduced pressure to give the desired product as an amber oil. $^1$H-NMR (CDCl$_3$, 500 MHz) δ 2.22 (dt, 2H), 3.77 (m, 6H), 4.4 (dt, 2H), 5.87 (dd, 1H), 6.12 (dd, 1H), 6.44 (dd, 1H).

Monomer Example B

[2-(Acryloyloxy)ethyl]phosphonic acid (AOE-PA)

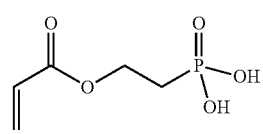

[2-(Acryloyloxy)ethyl]phosphonate dimethyl ester (monomer Example A, 3.0 g 0.014 mol) was added to a 100-mL round bottom flask. Anhydrous methylene chloride (30 mL) was added to the flask to dissolve the monomer and the mixture was stirred under nitrogen. The flask was then placed in an ice-water bath and stirred for 15 min. TMSBr (4.6 g, 0.03 mol) was added dropwise by syringe over a 5 min period with the flask continuously maintained in the ice-water bath and under a nitrogen atmosphere. The reaction was stirred for 2 h. The solvent was removed under reduced pressure and the resulting syrup was treated with 20 mL of methanol and stirred at room temperature for 1 h. Ther solution was then concentrated under reduced pressure to give the desired product as an amber oil. $^1$H-NMR (CDCl$_3$, 500 MHz) δ 2.27 (m, 2H), 4.43 (m, 2H), 5.88 (dd, 1H), 6.13 (dd, 1H), 6.43 (dd, 1H), 9.95 (s, 2H).

Monomer Example C

3-[[2-Methyl-2-(prop-2-enoylamino)propanoyl]amino]propylphosphonic acid (VDM-NH-PA)

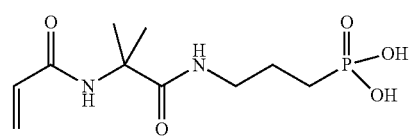 [SMILES: C=CC(=O)NC(C)(C)C(=O)NCCCP(=O)(O)O]

3-Aminopropylphosphonic acid (1.0 g, 0.0072 mol) was added to a 100 mL round bottom flask. An aqueous solution of sodium hydroxide (1.0 N, 14.4 mL) was added to the flask and the resulting mixture was stirred until the solids dissolved. The flask was then placed in an ice-water bath and stirred for 15 min. VDM (1.0 g, 0.0072 mol) was added dropwise via syringe and the reaction was stirred for 30 min with the flask continuously maintained in the ice-water bath. The cooling bath was then removed, and the reaction was allowed to warm to room temperature over a period of 1 h. A small amount of precipitate was removed by filtration. The pH of the filtrate was adjusted to about 7 by the addition of a few drops of a concentrated hydrochloric acid solution. $^1$H-NMR of an aliquot confirmed the formation of 3-[[2-methyl-2-(prop-2-enoylamino)propanoyl]amino]propylphosphonic acid. $^1$H-NMR (D$_2$O, 500 MHz) δ 1.19-1.26 (m, 2H), 1.35 (s, 6H), 1.48-1.57 (m, 2H), 3.07 (t, 2H), 5.62 (d, 1H), 6.0-6.2 (m, 2H).

Monomer Example D

3-[2-(2-Methylprop-2-enoyloxy)ethylcarbamoylamino]propylphosphonic acid (IEM-PA)

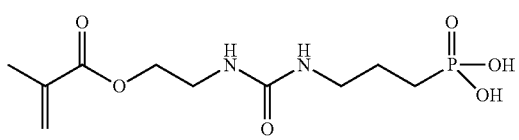 [SMILES: C=C(C)C(=O)OCCNC(=O)NCCCP(=O)(O)O]

3-Aminopropylphosphonic acid (1.0 g, 0.0072 mol) was added to a 100-mL round bottom flask. An aqueous solution of sodium hydroxide (1.0 N, 14.4 mL) was added to the flask and the resulting mixture was stirred until the solids dissolved. The flask was then placed in an ice-water bath and stirred for 15 min. IEM (1.12 g, 0.0072 mol) was added dropwise via syringe and the reaction was stirred for 30 min with the flask continuously maintained in the ice-water bath. The cooling bath was then removed, and the reaction was allowed to warm to room temperature over a period of 1 h. A small amount of precipitate was removed by filtration. The pH of the filtrate was adjusted to about 7 by the addition of a few drops of a concentrated hydrochloric acid solution. $^1$H-NMR of an aliquot of the filtrate confirmed the formation of 3-[2-(2-methylprop-2-enoyloxy)ethylcarbamoylamino]propylphosphonic acid. $^1$H-NMR (D$_2$O, 500 MHz) δ 1.20-1.27 (m, 2H), 1-47-1.55 (m, 2H), 1.79 (s, 3H), 2.97 (t, 2H), 3.31 (t, 2H), 4.09 (t, 2H), 5.58 (s 1H), 5.99 (s, 1H).

Monomer Example E (Intermediate for Monomer Example F)

2-Dimethoxyphosphorylethyl 2-methyl-2-(prop-2-enoylamino)propanoate

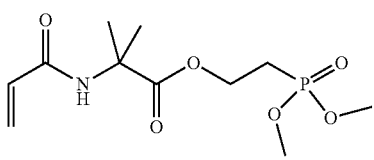 [SMILES: C=CC(=O)NC(C)(C)C(=O)OCCP(=O)(OC)OC]

Hydroxyethylphosphonate dimethyl ester (15.4 g, 0.099 mol) was added to a 250-mL round bottom flask together with 100 mL of methylene chloride. The flask was then placed in an ice-water bath and stirred for 15 min under nitrogen. DBU (1 mL) and VDM (15.3 g, 0.011 mol) were added dropwise via syringe and the reaction was stirred overnight under nitrogen. The next day, the reaction mixture was diluted with 100 mL of methylene chloride and washed twice with a 5% solution of monosodium phosphate, followed by washing with brine. The organic phase was dried over sodium sulfate, filtered and concentrated under reduced pressure to give the desired product as an amber oil. $^1$H-NMR (MeOD, 500 MHz) δ 1.48 (s, 6H), 2.20-2.27 (m, 2H), 3.76 (d, 6H), 4.27-4.33 (m, 2H), 5.65 (dd, 1H), 6.17-6.28 (m, 2H).

Monomer Example F

3-[[2-Methyl-2-(prop-2-enoylamino)propanoyl]oxyethylphosphonic acid (VDM-O-PA)

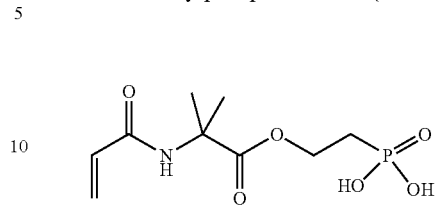

2-Dimethoxyphosphorylethyl 2-methyl-2-(prop-2-enoylamino)propanoate (monomer Example E, 3.1 g, 0.011 mol) was added to a 100-mL round bottom flask. Anhydrous methylene chloride (25 mL) was added to the flask to dissolve the monomer and the mixture was stirred under nitrogen. The flask was then placed in an ice-water bath and stirred for 15 min. TMSBr (3.4 g, 0.022 mol) was added dropwise via syringe over a 5 min period with the flask continuously maintained in the ice-water bath and under nitrogen. The reaction was stirred for 3 h. The solvent was removed under reduced pressure and the resulting syrup was treated with 20 mL of methanol and stirred at room temperature for 1 h. $^1$H-NMR of an aliquot confirmed the formation of 3-[[2-methyl-2-(prop-2-enoylamino)propanoyl]oxyethylphosphonic acid. $^1$H-NMR (CD$_3$OD, 500 MHz) δ 1.49 (s, 6H), 2.13 (m, 2H), 4.32 (m, 2H), 5.66 (dd, 1H), 6.17-6.28 (m, 2H).

Monomer Example G (Intermediate for Monomer H)

(2-Ethoxy-2-oxo-ethyl)-dimethyl-[3-(prop-2-enoylamino)propyl]ammonium, bromide

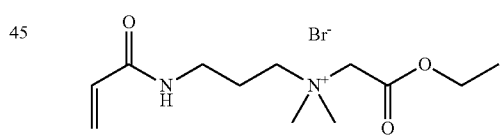

N-[3-(Dimethylamino)propyl]acrylamide (3.90 g, 0.025 mol) was added to a 250-mL round bottom flask. Acetonitrile (40 mL) was added to the flask under nitrogen flow and the resulting mixture was stirred until a homogeneous solution was formed. Ethyl bromoacetate (6.30 g, 0.038 mol) was added to the reaction mixture slowly via syringe while stirring. The reaction was stirred overnight at room temperature under nitrogen. The reaction mixture was then concentrated under reduced pressure to give a white solid. The solid was stirred in dry acetone and isolated by filtration to give 7.52 g of the desired product as a white powder. $^1$H-NMR (D$_2$O, 500 MHz) δ 1.17 (t, 3H), 1.94 (m, 2H), 3.17 (s, 6H), 3.27 (t, 2H), 3.51 (m, 2H), 4.18 (m, 4H), 5.67 (dd, 1H), 6.12 (m, 2H).

Monomer Example H

2-[Dimethyl-[3-(prop-2-enoylamino)propyl]ammonio]acetate (carboxy ZW)

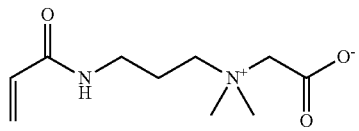

(2-Ethoxy-2-oxo-ethyl)-dimethyl-[3-(prop-2-enoylamino)propyl]ammonium, bromide (4.50 g, 0.014 mol) was dissolved in an aqueous solution of NaOH (2.0 M, 9 mL). The reaction mixture was stirred for 90 min. The reaction mixture was then neutralized by addition of an aqueous solution of hydrochloric acid (3.0 M, 1.1 mL). $^1$H-NMR of an aliquot of the solution confirmed the formation of 2-[dimethyl-[3-(prop-2-enoylamino)propyl]ammonio]acetate.
$^1$H-NMR (D$_2$O, 500 MHz) δ 1.98 (m, 2H), 3.17 (m, 6H), 3.33 (m, 2H), 3.55 (m, 2H), 3.83 (s, 2H), 5.73 (m, 1H), 6.18 (m, 2H).

Copolymer Preparation and Theoretical Molecular Weight

Copolymer theoretical (i.e., estimated) molecular weight was calculated based on the ratio of the mass of the consumed monomers and the moles of initiator. Extent of polymerization was measured by $^1$H-NMR analysis. All examples showed 90-99% consumption of (meth)acrylate monomers.

Example 1

A polymerization solution was prepared by mixing a solution of [2-(acryloyloxy)ethyl]phosphonic acid (monomer Example B) (0.324 g, 0.002 mol) in TFE (10 mL) with [2-(methacryloyloxy)ethyl]-dimethyl-(3-sulfopropyl)ammonium hydroxide (5.0 g, 0.018 mol), and the initiator methyl 2,2-bis (isopropoxycarbothioylsulfanyl)acetate (0.062 g, 0.0002 mol) in a 30-mL clear glass vial. The reaction mixture was purged with a stream of nitrogen for 15 min. The vial was then closed with a screw cap and placed on a bottle roller (ThermoFisher, 88881003) set at 25 rpm speed. Ultraviolet (UV)-initiated polymerization was conducted by irradiating the vial using a UV Benchtop lamp (UVP Blak Ray XX-15L, from Analytik Jena) equipped with 2 bulbs (365 nm, 15 W) and placed at 3 inches of distance from the vial. The polymerization reaction was exposed to UV radiation for 12 h. $^1$H-NMR of an aliquot showed a monomer conversion of >99%. The estimated molecular weight of the copolymer was approximately 30,000 Da. Analysis of solid content via Ohaus MB35 Halogen Moisture Analyzer (Ohaus Corporation, Parsippany, N.J.) showed a solid content of 36.7%.

Example 2

A polymerization solution was prepared in a 100-mL round bottom flask by mixing a solution of 3-[[2-methyl-2-(prop-2-enoylamino)propanoyl]amino]propylphosphonic acid (2.15 g of the solution obtained in the preparation of monomer Example C) with [3-(methacryloylamino)propyl] dimethyl(3-sulfopropyl)ammonium hydroxide (0.72 g, 0.0025 mol) and the initiator 4,4'-azobis(4-cyanovaleric acid) (ACPA) (0.07 g, 0.00025 mol) in an aqueous solution of sodium chloride (0.5 M, 25 mL), which was used to enhance solubility of the monomers. The flask was connected to a condenser and the reaction mixture was purged with a stream of nitrogen for 15 min. The flask was then placed in an oil bath heated at 85° C. and kept at that temperature while stirring overnight under nitrogen. $^1$H-NMR of an aliquot showed a monomer conversion of about 99%. The estimated molecular weight of the copolymer was approximately 2,000 Da.

Example 3

A polymerization solution was prepared in a 100-mL round bottom flask by mixing 3-[[2-methyl-2-(prop-2-enoylamino)propanoyl]amino]propylphosphonic acid (4.09 g of the solution obtained in the preparation of monomer Example C) with [3-(methacryloylamino)propyl]dimethyl (3-sulfopropyl)ammonium hydroxide (2.34 g, 0.008 mol) and the initiator 4,4'-azobis(4-cyanovaleric acid) (ACPA) (0.014 g, 0.00005 mol) in an aqueous solution of sodium chloride (0.5 M, 29 mL). The procedure described in Example 2 was followed to provide the final polymer. $^1$H-NMR of an aliquot showed a monomer conversion of about 97%. The estimated molecular weight of the copolymer was approximately 30,000 Da.

Example 4

A polymerization solution was prepared in a 250-mL round bottom flask by mixing 3-[[2-methyl-2-(prop-2-enoylamino)propanoyl]amino]propylphosphonic acid (6.4 g of the solution obtained in the preparation of monomer Example C) with [3-(methacryloylamino)propyl]dimethyl (3-sulfopropyl)ammonium hydroxide (8.2 g, 0.028 mol) and the initiator 4,4'-azobis(4-cyanovaleric acid) (ACPA) (0.014 g, 0.00005 mol) in an aqueous solution of sodium chloride (0.5 M, 85 mL). The procedure described in Example 2 was followed to provide the final polymer. $^1$H-NMR of an aliquot showed a monomer conversion of about 96%. The estimated molecular weight of the copolymer was approximately 100,000 Da.

Example 5

A polymerization solution was prepared in a 250-mL round bottom flask by mixing 3-[[2-methyl-2-(prop-2-enoylamino)propanoyl]amino]propylphosphonic acid (0.7 g of the solution obtained in the preparation of monomer Example C) with [3-(methacryloylamino)propyl]dimethyl (3-sulfopropyl)ammonium hydroxide (9.8 g, 0.033 mol) and the initiator 4,4'-azobis(4-cyanovaleric acid) (ACPA) (0.007 g, 0.00003 mol) in an aqueous solution of sodium chloride (0.5 M, 90 mL). The procedure described in Example 2 was followed to provide the final polymer. $^1$H-NMR of an aliquot showed a monomer conversion of about 95%. The estimated molecular weight of the copolymer was approximately 200,000 Da.

Example 6

A polymerization solution was prepared in a 100-mL round bottom flask by mixing 3-[2-(2-methylprop-2-enoyloxy)ethylcarbamoylamino]propylphosphonic acid (0.28 g of the solution obtained in the preparation of monomer Example D) with [3-(methacryloylamino)propyl]dimethyl (3-sulfopropyl)ammonium hydroxide (3.92 g, 0.013 mol) and the initiator 4,4'-azobis(4-cyanovaleric acid) (ACPA) (0.003 g, 0.00001 mol) in an aqueous solution of sodium chloride (0.5 M, 36 mL). The procedure described in Example 2 was followed to provide the final polymer. $^1$H-NMR of an aliquot showed a monomer conversion of about 90%. The estimated molecular weight of the copolymer was approximately 200,000 Da.

Example 7

A polymerization solution was prepared in a 100-mL round bottom flask by mixing 3-[2-(2-methylprop-2-enoyloxy)ethylcarbamoylamino]propylphosphonic acid (0.04 g of the solution obtained in the preparation of monomer Example D) with 2-[dimethyl-[3-(prop-2-enoylamino)propyl]ammonio]acetate (monomer Example H) (21.39 g of a 0.93 M solution in water) and the initiator 4,4'-azobis(4-cyanovaleric acid) (ACPA) (0.001 g, 0.005 mol). The procedure described in Example 2 was followed to provide the final polymer. $^1$H-NMR of an aliquot showed a monomer conversion of about 98%. The estimated molecular weight of the copolymer was approximately 500,000 Da.

Example 8

A polymerization solution was prepared in a 100-mL round bottom flask by mixing 3-[2-(2-methylprop-2-enoyloxy)ethylcarbamoylamino]propylphosphonic acid (8.17 g of the solution obtained in the preparation of monomer Example D) with 2-[dimethyl-[3-(prop-2-enoylamino)propyl]ammonio]acetate (monomer Example H) (4.28 g of a 0.93 M solution in water) and the initiator 4,4'-azobis(4-cyanovaleric acid) (ACPA) (0.028 g, 0.1 mol) in an aqueous solution of sodium chloride (0.5 M, 30 mL). The procedure described in Example 2 was followed to provide the final polymer. $^1$H-NMR of an aliquot showed a monomer conversion of about 98%. The estimated molecular weight of the copolymer was approximately 10,000 Da.

Example 9

A polymerization solution was prepared in a 100-mL round bottom flask by mixing 3-[[2-methyl-2-(prop-2-enoylamino)propanoyl]oxyethylphosphonic acid (2.51 g of the solution obtained in the preparation of monomer Example F) in TFE (14 mL) with [2-(methacryloyloxy)ethyl]-dimethyl-(3-sulfopropyl)ammonium hydroxide (2.26 g, 0.081 mol), and the initiator IRGACURE 651 (0.013 g, 0.05 mol) in a 30 mL clear glass vial. The procedure described in Example 1 was followed to provide the final polymer. $^1$H-NMR of an aliquot showed a monomer conversion of about 90%. The estimated molecular weight of the copolymer was approximately 50,000 Da.

Coating Composition Preparation

Example 10

A 0.1 wt-% coating solution was prepared by diluting the 0.14 g of the copolymer solution prepared in Example 1 with 50 mL of deionized water in a polyethylene bottle.

Example 11

A 0.1 wt-% coating solution was prepared by diluting 0.4 g of the copolymer solution prepared in Example 2 with 19.6 mL of deionized water in a polyethylene bottle.

Example 12

A 0.1 wt-% coating solution was prepared by diluting 0.2 g of the copolymer solution prepared in Example 3 with 19.8 mL of deionized water in a polyethylene bottle.

Example 13

A 0.1 wt-% coating solution was prepared by diluting 0.2 g of the copolymer solution prepared in Example 4 with 19.8 mL of deionized water in a polyethylene bottle.

Example 14

A 0.1 wt-% coating solution was prepared by diluting 0.2 g of the copolymer solution prepared in Example 5 with 19.8 mL of deionized water in a polyethylene bottle.

Example 15

A 0.1 wt-% coating solution was prepared by diluting 0.2 g of the copolymer solution prepared in Example 6 with 19.8 mL of deionized water in a polyethylene bottle.

Example 16

A 0.1 wt-% coating solution was prepared by diluting 0.1 g of the copolymer solution prepared in Example 7 with 19.9 mL of deionized water in a polyethylene bottle.

Example 17

A 0.1 wt-% coating solution was prepared by diluting 0.1 g of the copolymer solution prepared in Example 8 with 19.9 mL of deionized water in a polyethylene bottle.

Example 18

A 0.1 wt-% coating solution was prepared by diluting 0.1 g of the copolymer solution prepared in Example 9 with 19.9 mL of deionized water in a polyethylene bottle.

Article Preparation

Example 19

A stainless-steel test panel (5 cm×2.5 cm) was soaked overnight in a solution of 0.25% potassium hydroxide in a 50:50 by volume isopropyl alcohol/water. Then the panel was removed and cleaned using Ajax Powder Detergent, available from Colgate Palmolive Company, New York, N.Y. The panel was scrubbed by hand with the Ajax Powder Detergent mixed with deionized water using a Polynit wipe PN-99, 100% PET (Contec, Spartanburg, S.C.). The panel was rinsed with deionized water to remove any residue and air dried before testing. The panel was coated within 24 h of the cleaning procedure.

A coating composition of Example 10 was applied on the surface using an imbibed polyester knit wipe (PN-99 Polynit wipe from Contec) and let dry at room temperature overnight. The next day, excess coating was removed by wiping the surface with a water-moistened wipe (PN-99 Polynit wipe from Contec).

Example 20

The same procedure as reported for Example 19 was followed using coating solution of Example 11.

Example 21

The same procedure as reported for Example 19 was followed using coating solution of Example 12.

Example 22

The same procedure as reported for Example 19 was followed using coating solution of Example 13.

Example 23

The same procedure as reported for Example 19 was followed using coating solution of Example 14.

Example 24

The same procedure as reported for Example 19 was followed using coating solution of Example 15.

Example 25

The same procedure as reported for Example 19 was followed using coating solution of Example 16 except the coating was applied on the cleaned panel using an imbibed Spuntech 80 gsm SQ VIS 30% PET 70% wipe.

Example 26

The same procedure as reported for Example 25 was followed using coating solution of Example 17.

Example 27

The same procedure as reported for Example 25 was followed using coating solution of Example 18.

Example 28

The same procedure as reported for Example 25 was followed using coating solution of Example 15 except the coating was applied on an aluminum panel (Anodized Aluminum 6061) cleaned using the same procedure described on Example 19 with the exception that panel was not soaked overnight in a solution of 0.25% potassium hydroxide in a 50:50 by volume isopropyl alcohol/water.

Comparative Example A

The procedure for preparing the stainless-steel panel described in Example 19 was followed with the exception that no coating solution was applied.

Comparative Example B

An aluminum panel (Anodized Aluminum 6061) was cleaned using the same procedure in Example 28 and no coating solution was applied afterward.

Peanut Oil Removal Test

The coated panels of Examples 19-28 and Comparative Examples A and B were soiled with 0.5 mL of Planters 100% peanut oil (Kraft Heinz Company, Chicago, Ill.) spread across the bottom portion of the panel using a 1-inch (2.54-cm) wide polyurethane foam applicator. The panels were then immersed in deionized water to allow removal of peanut oil layer. After 30 seconds, pictures of the immersed panels were taken using a camera on an iPhone5 to record the amount of oil remaining on the surface of the panel. Images collected were analyzed by ImageJ software (NIH, https://imagej.nih.gov/ij/). The area of the panel soiled with oil before immersing the panel in water was measured and reported in Table 2 as "Initial Oil Coverage" (areas in pixels). The area of the panel soiled with oil after immersing the panel in water for 30-seconds was measured and reported in Table 2 as "Final Oil Coverage." The percent of peanut oil removal was determined by comparison of the initial and final soiled areas according to Equation 1.

$$\text{Oil Removal}(\%) = \left(\frac{\text{Initial Oil Coverage} - \text{Final Oil Coverage}}{\text{Initial Oil Coverage}}\right) \times 100 \qquad \text{Equation 1}$$

Coating Durability Test

The same coated panels of Examples 19-28 and Comparative Examples A and B were then wiped clean with a water-imbibed polyester knit wipe (PN-99 Polynit wipe from Contec). The panels were then rinsed with isopropanol and allowed to air dry. The panels were then abraded using the mechanical wiping device described in U.S. Pat. No. 10,087,405B2 (Swanson et al., step 9 of Example 8 with the exception that the device was operated at a linear mode instead of an orbital mode). A water moistened nylon 6,6-PA wipe (PBNII 30200 by Cerex Advanced Fabrics, Cantonment, Fla.) was mounted on the lever arm of the device and the panels were mounted on the platform of the device. The lever arm was then lowered onto the mounted panel. The lever arm had a mass of about 350 g. The mechanical wiping device was then switched on and the panels were abraded for 30 see at a speed of 120 passes per minute (a pass being defined as a complete back-and-forth cycle of the arm over the panel). The panels were then soiled again with peanut oil and tested following the Peanut Oil Removal Test procedure.

Example 29

Coated panel of Example 19 was wiped and abraded according the Coating Durability Test method and resubjected to the Peanut Oil Removal Test.

Example 30

Coated panel of Example 20 was wiped and abraded according the Coating Durability Test method and resubjected to the Peanut Oil Removal Test.

Example 31

Coated panel of Example 21 was wiped and abraded according the Coating Durability Test method and resubjected to the Peanut Oil Removal Test.

Example 32

Coated panel of Example 22 was wiped and abraded according the Coating Durability Test method and resubjected to the Peanut Oil Removal Test.

Example 33

Coated panel of Example 23 was wiped and abraded according the Coating Durability Test method and resubjected to the Peanut Oil Removal Test.

Example 34

Coated panel of Example 24 was wiped and abraded according the Coating Durability Test method and resubjected to the Peanut Oil Removal Test.

Example 35

Coated panel of Example 25 was wiped and abraded according the Coating Durability Test method and resubjected to the Peanut Oil Removal Test.

Example 36

Coated panel of Example 26 was wiped and abraded according the Coating Durability Test method and resubjected to the Peanut Oil Removal Test.

Example 37

Coated panel of Example 27 was wiped and abraded according the Coating Durability Test method and resubjected to the Peanut Oil Removal Test.

Example 38

Coated panel of Example 28 was wiped and abraded according the Coating Durability Test method and resubjected to the Peanut Oil Removal Test.

Comparative Example A2

Coated panel of Comparative Example A was wiped and abraded according the Coating Durability Test method and resubjected to the Peanut Oil Removal Test.

Comparative Example B2

Coated panel of Comparative Example B was wiped and abraded according the Coating Durability Test method and resubjected to the Peanut Oil Removal Test.

Combined results for before and after abrasion oil removal test are summarized in Table 2.

Clean and Protect Formulations

Example 39

A solution of 0.1 wt-% Example 6, and 2 wt-% of a mixture of cleaning agents (monethanolamine (alkalinity source):BIOSOFT S101 (anionic surfactant):Benzyl Alcohol (organic solvent):TOMADOL 91-6 (nonionic surfactant) in equal ratios) were combined with deionized water.

Example 40

A solution of 2 wt-% of monethanolamine:BIOSOFT S101:Benzyl Alcohol:TOMADOL 91-6 (in equal ratios) was combined with deionized water.

Clean and Protect Testing Procedure

An 18 gauge 9 in×2 in (22.9 cm×5.1 cm) stainless-steel panel was thoroughly cleaned with soap and water using a Scotchbrite 96 (green) scouring pad. The panel was placed in a Heavy Duty Wear tester (made for 3M by General Electric, and similar to the BYK Gardner test machine disclosed at www.gardco.com/pages/abrasion/washability.cfn). A 3 in×5 in (7.6 cm×12.7 cm) SCOTCHBRITE 96 Pad was attached to the Heavy Duty Wear tester using hook and loop secured to the conditioning head of the machine. The head provided 1.7 kg of downforce on the panel. Deionized water (2-3 mL) was applied to the surface of the panel with a small amount of Ajax cleaning powder. The head with pad attached was lowered and leveled. The device was set to run 100 cycles and started. Additional 2-3 mL of water was added after 50 cycles to keep the panel wetted evenly. After the 100 cycles were completed, the panel was removed and washed with deionized water and dried. Each panel was further wiped clean with IPA using KIMTECH Kimwipe. One mL of vegetable oil (Wesson) was applied at the bottom of each cleaned panel and spread evenly using a #16 Mayer rod. Soiled panels were placed in oven at 195° F. (91° C.) for 16 h. Panels were cooled to room temperature before proceeding.

Soiled panels were placed with the soiled surface facing up in the Heavy Duty Wear tester holder with the head attached, supplying 1.7 kg of downforce. A 3 in×5 in (7.6 cm×12.7 cm) Spuntech 80 gsm SQ VIS 30% PET 70% wipe was imbibed with 4.4 g of a coating solution (either from Example 15 or Example 39 or Example 40) and attached to

TABLE 2

Oil Removal from Coated Articles after 30-second Immersion in Water

| Article Number (before/after abrasion) | Copolymer Used for Coating | Before Abrasion | | | After Abrasion | | |
|---|---|---|---|---|---|---|---|
| | | Initial Oil Coverage (area in pixels) | Final Oil Coverage (area in pixels) | Oil Removal (%) | Initial Oil Coverage (area) | Final Oil Coverage (area) | Oil Removal (%) |
| Example 19/29 | Example 1 | 37020 | 5898 | 84.1 | 36210 | 3650 | 89.9 |
| Example 20/30 | Example 2 | 34444 | 4566 | 86.7 | 37422 | 16118 | 56.9 |
| Example 21/31 | Example 3 | 38016 | 7308 | 80.8 | 41040 | 13837 | 66.3 |
| Example 22/32 | Example 4 | 36738 | 1546 | 95.8 | 39520 | 5473 | 86.2 |
| Example 23/33 | Example 5 | 39319 | 2360 | 94.0 | 34701 | 10004 | 71.2 |
| Example 24/34 | Example 6 | 38190 | 80 | 99.8 | 39664 | 119 | 99.7 |
| Example 25/35 | Example 7 | 37820 | 7562 | 80.0 | 45594 | 22198 | 51.3 |
| Example 26/36 | Example 8 | 35991 | 22234 | 38.2 | 45315 | 42373 | 6.5 |
| Example 27/37 | Example 9 | 37088 | 5436 | 85.3 | 40095 | 8698 | 78.3 |
| Example 28/38 | Example 6 | 26596 | 0 | 100 | 38829 | 2209 | 94.3 |
| Comp. A/A2 | — | 38480 | 37875 | 1.6 | 38412 | 37926 | 1.3 |
| Comp. B/B2 | — | 50544 | 49195 | 2.6 | 44541 | 44072 | 1.1 | the head via hook and loop fasteners. The head was lowered and leveled on the test panel. The machine was run for 100 cycles. The wipe was replaced with a new one, freshly wetted with 4.4 g of the same coating solution and an additional 100 cycles were run. At this point the percent soil removed from the surface was measured using a 9 in×2 in (22.9 cm×5.1 cm) transparent piece of PET film laminated with a grid divided equally into 100 squares. If soil was completely removed from a square it was counted as clean. If some squares were partially soiled they were combined to give an additive value to the % clean evaluation. Results are reported as "Initial Soiling Removal %" in Table 3.

Example 41

Panel treated according to the Clean and Protect Testing Procedure using solution from Example 15.

Example 42

Panel treated according to the Clean and Protect Testing Procedure using solution from Example 39.

Example 43

Panel treated according to the Clean and Protect Testing Procedure using solution from Example 40.

TABLE 3

| Example | Initial Soiling Removal % |
| --- | --- |
| Example 41 | 12 |
| Example 42 | 98 |
| Example 43 | 99 |

The results shown in Table 3 demonstrate that the copolymer alone is not effective as a cleaner for soiled surface (Example 41), compared to a mixture of only cleaning agents (Example 43), but the copolymer does not inhibit the cleaning performance of added cleaning agents (Example 42).

Evaluation of Protective Benefits After Initial Cleaning

Example 44

After the % soil removed was measured on the panel of Example 42, the wipe on the Heavy Duty Wear tester was replaced with 3 in×5 in (7.6 cm×12.7 cm) SCOTCHBRITE 98 pad. Additional test solution was applied to the surface of the panel and the pad was lowered and leveled onto the panel. An additional 50 cycles were run. The panel was then removed from the holder and placed on the bench to dry overnight.

The panel was then subjected to the "Fingerprint Removal Test" and to the "Vegetable Oil Removal Test" described below to determine if a protective benefit had been imparted to the surface. Before any testing, the panel was rubbed with a KIMTECH Kimwipe and 1 mL of deionized water 10 cycles.

Example 45

The same procedure as reported for Example 44 was followed using the panel of Example 43.

Fingerprint Removal Test

Using facial oil, the previously soiled and cleaned stainless-steel panels of Examples 44 and 45 had a fingerprint applied with approximately (~) 250 grams (g) of force. The samples were allowed to stand for a period of time less than 5 min at room temperature. The samples were subsequently subjected to a wash solution of 0.1 wt-% of TOMADOL 91-6 (1 mL) applied via pipette over a period of 30 seconds before drying the samples with compressed air. The samples were visually inspected and scored on a scale of 1=complete removal, 2=partial removal, and 3=no removal. The results are reported as "Fingerprint Removal" in Table 4.

Vegetable Oil Removal Test

The stainless-steel panels of Examples 44 and 45 had a drop (~0.15 g) of Wesson vegetable oil (ConAgra Foods, Omaha, Nebr.) applied on a different portion of the treated surface and the samples were allowed to stand for a period of time less than 5 min at room temperature. The samples were subsequently subjected to a wash solution of 0.1 wt-% of TOMADOL 91-6 (1 mL) applied via pipette over a period of 30 seconds before drying the samples with compressed air. The samples were visually inspected and scored on a scale of 1=complete removal, 2=partial removal, and 3=no removal. The results are reported as "Oil Removal" in Table 4.

TABLE 4

| Example | Fingerprint Removal | Oil Removal |
| --- | --- | --- |
| Example 44 | 1 | 1 |
| Example 45 | 3 | 3 |

The results show in Table 4 illustrate that the copolymer still provides a beneficial protective coating even when combined with cleaning agents (Example 44). The cleaning agents alone do not provide any beneficial protective coating (Example 45).

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A copolymer comprising:
   (a) first monomeric units derived from monomers of Formula (I)

$$CH_2=CR^1—(CO)—X—R^2—[-Q-R^3—]_n—Y \qquad (I)$$

or salts thereof, wherein:

$R^1$ is hydrogen or methyl;

X is oxy or —NH—;

$R^2$ is an alkylene optionally including catenary oxygen;

$R^3$ is an alkylene;

Q is —(CO)O—, —$NR^4$—(CO)—$NR^4$—, or —(CO)—$NR^4$—;

$R^4$ is hydrogen or alkyl;

n is equal to 1; and

Y is phosphonic acid, phosphonate, phosphoric acid, or phosphate; and
(b) second monomeric units derived from monomers of Formula (II)

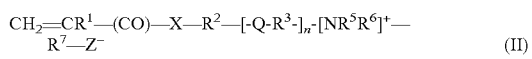  (II)

wherein:
R¹ is hydrogen or methyl;
X is oxy or —NH—;
R² is alkylene optionally including catenary oxygen;
R³ is alkylene;
Q is —(CO)O—, —NR⁴—(CO)—NR⁴—, or —(CO)—NR⁴—;
R⁴ is hydrogen or alkyl;
n is equal to 0 or 1;
R⁵ and R⁶ are each independently an alkyl, aryl, or a combination thereof, or R⁵ and R⁶ both combine with the nitrogen to which they are both attached to form a heterocyclic ring having 3 to 7 ring members;
R⁷ is alkylene; and
Z⁻ is carboxylate or sulfonate.

2. The copolymer of claim 1, wherein the copolymer is a random copolymer.

3. The copolymer of claim 1, wherein the monomers of Formula (I) are selected from:

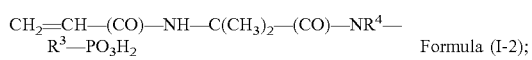 Formula (I-2);

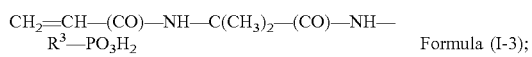 Formula (I-3);

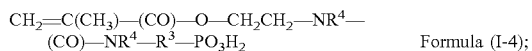 Formula (I-4);

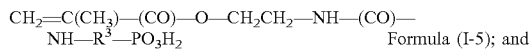 Formula (I-5); and

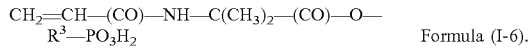 Formula (I-6).

4. The copolymer claim 1, wherein the monomers of Formula (II) are selected from:

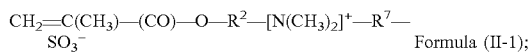 Formula (II-1);

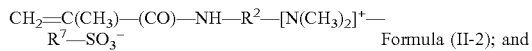 Formula (II-2); and

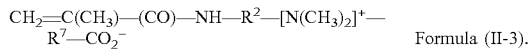 Formula (II-3).

5. The copolymer of claim 1, to wherein the copolymer comprises 0.1 to 50 mole percent first monomeric units derived from monomers of Formula (I) and 50 to 99 mole percent second monomeric units derived from monomers of Formula (II).

6. The copolymer of claim 1, wherein the copolymer comprises at least two monomeric units derived from monomers of Formula (I), and has a theoretical weight average molecular weight (Mw) of at least 2,000 Daltons.

7. A coating composition comprising the copolymer of claim 1.

8. The coating composition of claim 7, wherein the copolymer is present in an amount of 0.001 wt-% to 50 wt-%, based on the total weight of the coating composition.

9. The coating composition of claim 7 further comprising one or more additives selected from the group of surfactants, organic solvents, alkalinity sources, water conditioning agents, bleaching agents, dyes, fragrances, corrosion inhibitors, enzymes, thickeners, wetting and leveling agents, adhesion promoters, and combinations thereof.

10. The coating composition of claim 7, wherein a hardened coating formed from the coating composition on a surface demonstrates:
at least 50% peanut oil removal according to the Peanut Oil Removal Test;
at least partial removal of fingerprints according to the Fingerprint Removal Test; or
at least partial removal of vegetable oil according to the Vegetable Oil Removal Test.

11. The coating composition of claim 7, wherein a hardened coating on a surface, after being abraded according to the Coating Durability Test, demonstrates at least 50% peanut oil removal according to the Peanut Oil Removal Test.

12. An article comprising:
a substrate; and
a coating adjacent to the substrate, wherein the coating comprises a copolymer of claim 1.

13. The article of claim 12, wherein the substrate has a surface comprising a metal and the coating is a hardened coating thereon.

14. The article of claim 13, wherein the metal surface comprises stainless steel, aluminum, anodized aluminum, titanium, zinc, silver, a surface oxide thereof, or a combination thereof.

15. The article of claim 13, wherein the metal surface forms at least a portion of a refrigerator, dishwasher, stove, oven, microwave, exhaust hood, fryer, grease trap, food-preparation table, cabinet, toilet stall partition, urinal partition, decorative or functional wall cladding in or on an elevator or escalator, wall in a commercial building, decorative or functional panel in an automobile, metal case for an electronic article, piece of manufacturing equipment, or tool.

16. The article of claim 12, wherein the substrate is a flexible fibrous substrate.

17. The article of claim 16, wherein the article is a wipe and the coating adjacent the substrate comprises a coating composition impregnated within the fibrous substrate.

* * * * *